US009049100B2

(12) United States Patent
De Foy et al.

(10) Patent No.: US 9,049,100 B2
(45) Date of Patent: Jun. 2, 2015

(54) METHOD AND APPARATUS FOR PROVIDING INTERFACING BETWEEN CONTENT DELIVERY NETWORKS

(71) Applicant: INTERDIGITAL PATENT HOLDINGS, INC., Wilmington, DE (US)

(72) Inventors: Xavier De Foy, Kirkland (CA); Hang Liu, Yardley, PA (US); Serhad Doken, Chester Springs, PA (US); Osama Lotfallah, King of Prussia, PA (US); Shamim Akbar Rahman, Cote St. Luc (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 118 days.

(21) Appl. No.: 13/650,718

(22) Filed: Oct. 12, 2012

(65) Prior Publication Data
US 2013/0094445 A1      Apr. 18, 2013

Related U.S. Application Data

(60) Provisional application No. 61/546,819, filed on Oct. 13, 2011.

(51) Int. Cl.
*H04L 12/755* (2013.01)
(52) U.S. Cl.
CPC .................................. *H04L 45/021* (2013.01)
(58) Field of Classification Search
USPC ......... 709/217, 203, 204, 207, 218, 219, 223, 709/224, 227, 228; 725/114, 116, 146, 93; 762/2; 370/328
See application file for complete search history.

(56) References Cited

U.S. PATENT DOCUMENTS

| | | | | |
|---|---|---|---|---|
| 7,240,100 | B1 * | 7/2007 | Wein et al. ..................... | 709/214 |
| 7,359,985 | B2 * | 4/2008 | Grove et al. ................... | 709/238 |
| 7,991,910 | B2 * | 8/2011 | Richardson et al. .......... | 709/238 |
| 8,429,221 | B2 * | 4/2013 | Barbir et al. .................. | 709/203 |
| 8,583,769 | B1 * | 11/2013 | Peters et al. ................... | 709/221 |
| 8,667,172 | B2 * | 3/2014 | Ravindran et al. ............ | 709/238 |
| 2002/0116481 | A1 | 8/2002 | Lee | |

(Continued)

OTHER PUBLICATIONS

Davie et al., Framework for CDN Interconnection: draft-davie-cdni-framework-00, Jul. 1, 2011, IETF.*

(Continued)

*Primary Examiner* — Benjamin H Elliott, IV
*Assistant Examiner* — Eric Nowlin
(74) *Attorney, Agent, or Firm* — Invention Mine LLC

(57) ABSTRACT

A method and apparatus are described for forwarding content delivery network interconnection (CDNI) signaling. A CDNI router content delivery network (CDN) may establish CDNIs with upstream and downstream CDNs. The CDNI router CDN may receive a CDNI route advertisement message from at least one of the upstream and downstream CDNs. The CDNI router CDN may update at least one end-user-based CDNI routing table based on Internet protocol (IP) address blocks in the CDNI route advertisement message. The CDNI router CDN may transmit an updated CDNI route advertisement message to at least one of the upstream and downstream CDNs. At least one of the upstream and downstream CDNs may update at least one end-user-based CDNI routing table based on the end user IP address blocks in the updated CDNI route advertisement message.

21 Claims, 20 Drawing Sheets

(56) References Cited

U.S. PATENT DOCUMENTS

| | | | | |
|---|---|---|---|---|
| 2002/0176359 | A1* | 11/2002 | Durinovic-Johri et al. | 370/229 |
| 2008/0008089 | A1* | 1/2008 | Bornstein et al. | 370/227 |
| 2008/0215735 | A1* | 9/2008 | Farber et al. | 709/226 |
| 2009/0029644 | A1* | 1/2009 | Sue et al. | 455/3.02 |
| 2009/0031376 | A1* | 1/2009 | Riley et al. | 725/105 |
| 2009/0135824 | A1* | 5/2009 | Liu | 370/392 |
| 2009/0157850 | A1* | 6/2009 | Gagliardi et al. | 709/219 |
| 2009/0248893 | A1* | 10/2009 | Richardson et al. | 709/239 |
| 2010/0070603 | A1* | 3/2010 | Moss et al. | 709/207 |
| 2010/0125675 | A1* | 5/2010 | Richardson et al. | 709/242 |
| 2010/0332589 | A1* | 12/2010 | Schwimer | 709/203 |
| 2011/0153941 | A1* | 6/2011 | Spatscheck et al. | 711/119 |
| 2013/0067530 | A1* | 3/2013 | Spektor et al. | 726/1 |
| 2013/0080613 | A1* | 3/2013 | Thireault | 709/223 |

OTHER PUBLICATIONS

Niven-Jenkins et al., Content Distribution Network Interconnection (CDNI) Problem Statement: draft-ietf-cdni-problem-statement-00, Sep. 9, 2011, IETF.*

Barbir et al., "Known Content Network (CN) Request-Routing Mechanisms," Network Working Group, Request for Comments: 3568 (Jul. 2003).

Bertrand et al., "Use Cases for Content Delivery Network Interconnection," Internet Engineering Task Force, Internet-Draft (Jul. 7, 2011).

Broberg et al., "MetaCDN: Harnessing 'Storage Clouds' for high performance content delivery," available at: http://citeseer.ist.psu.edu/viewdoc/download;jsessionid=CF2185C1DA43E7695FFECFDA5509854B?doi=10.1.1.144.7766&rep=rep1&type=pdf (last visited Dec. 17, 2012).

Day et al., "A Model for Content Internetworking (CDI)," Network Working Group, Request for Comments: 3466 (Feb. 2003).

Niven-Jenkins et al., "Content Distribution Network Interconnection (CDNI) Problem Statement," Network Working Group, Internet-Draft (Mar. 13, 2011).

Pathan et al., "A Taxonomy and Survey of Content Delivery Networks," Technical Report (2007).

Penno et al., "ALTO and Content Delivery Networks," Network Working Group, Internet-Draft (Mar. 14, 2011).

Rzewski et al., "Content Internetworking (CDI) Scenarios," Network Working Group, Request for Comments: 3570 (Jul. 2003).

Visolve, "Transparent Cache Implementation Using Squid," available at: http://www.visolve.com/system_services/opensource/squid/mysql-squid-log/Technical-White-Papers/trans_caching.php (last visited Dec. 17, 2012).

Zhang et al., "Video on-demand streaming on the Internet—A survey," 2010 25th Biennial Symposium on Communications (QBSC), pp. 88-91, (May 12-14, 2010).

* cited by examiner

METHOD AND APPARATUS FOR PROVIDING INTERFACING BETWEEN CONTENT DELIVERY NETWORKS

CROSS REFERENCE TO RELATED APPLICATIONS

This application claims the benefit of U.S. Provisional Application No. 61/546,819 filed Oct. 13, 2011, which is incorporated by reference as if fully set forth.

BACKGROUND

Access providers in an access provider network, such as mobile network operators (MNOs) and Internet service providers (ISPs), are currently not aware of individual content deliveries. This limits the possibility for an access provider to optimize deliveries in order to solve issues related to quality of experience (QoE). For example, content may be delivered locally to increase QoE, mobility may be implemented to assist session delivery transfer, and content popularity may be implemented to group a set of deliveries using multicast or point-to-point (P2P). This may be achieved by deploying a content delivery network (CDN) in the access provider network, which may be tightly integrated with the access provider infrastructure.

A brokering content network (BCN) may not operate its own surrogates, and instead may provide interoperability service to other CDNs. In particular, BCNs may implement request routing and accounting interworking. Unless there is pre-agreement between CDNs, there is currently no way for an upstream CDN to decide which downstream CDN to communicate with.

SUMMARY

A method and apparatus are described for forwarding content delivery network interconnection (CDNI) signaling. A CDNI router content delivery network (CDN) may establish CDNIs with upstream and downstream CDNs. The CDNI router CDN may receive a CDNI route advertisement message from at least one of the upstream and downstream CDNs. The CDNI router CDN may update at least one end-user-based CDNI routing table based on Internet protocol (IP) address blocks in the CDNI route advertisement message. The CDNI router CDN may transmit an updated CDNI route advertisement message to at least one of the upstream and downstream CDNs. At least one of the upstream and downstream CDNs may update at least one end-user-based CDNI routing table based on the end user IP address blocks in the updated CDNI route advertisement message.

BRIEF DESCRIPTION OF THE DRAWINGS

A more detailed understanding may be had from the following description, given by way of example in conjunction with the accompanying drawings wherein.

DETAILED DESCRIPTION

Figure 1A:
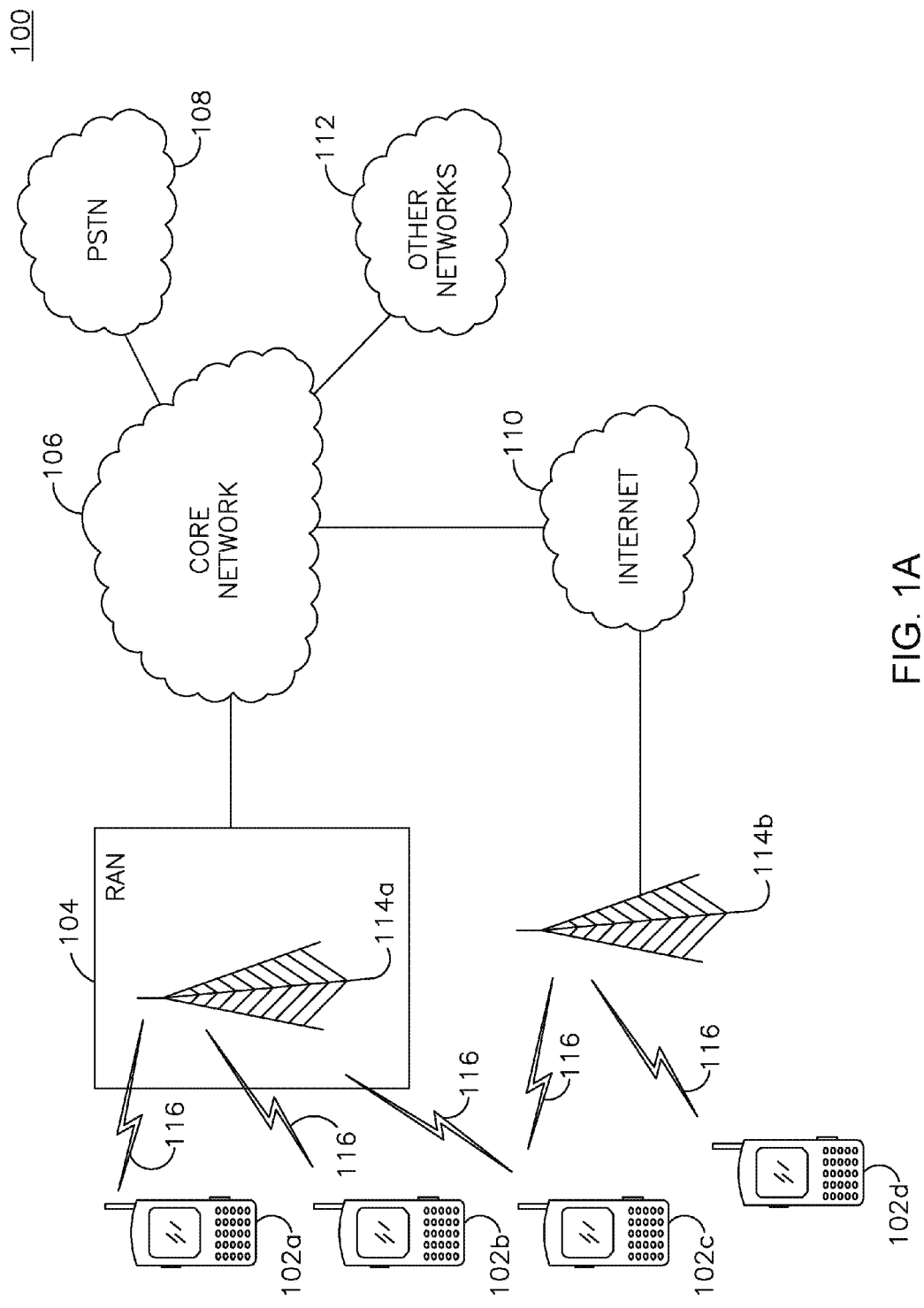
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a home Node-B (HNB), a home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
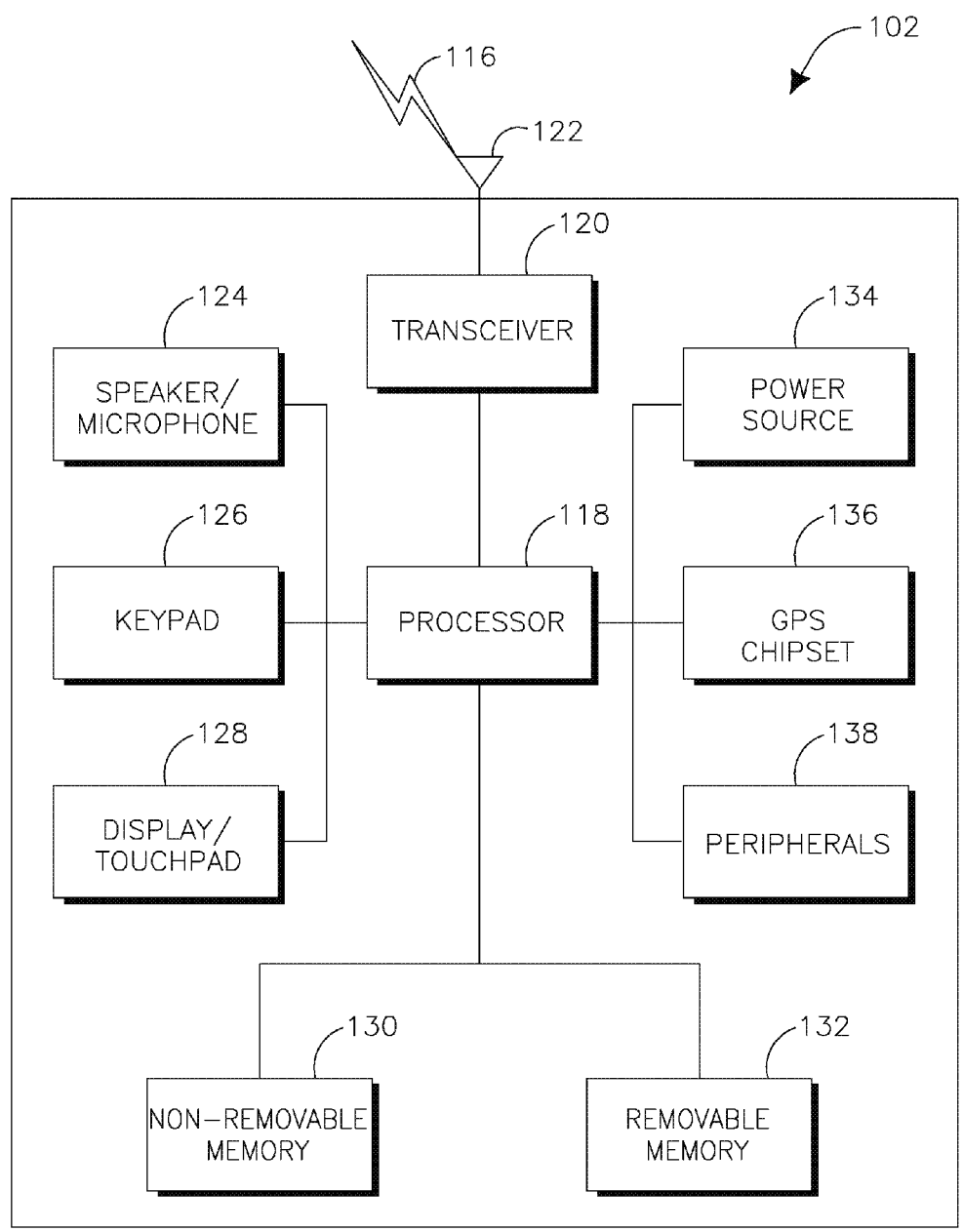
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
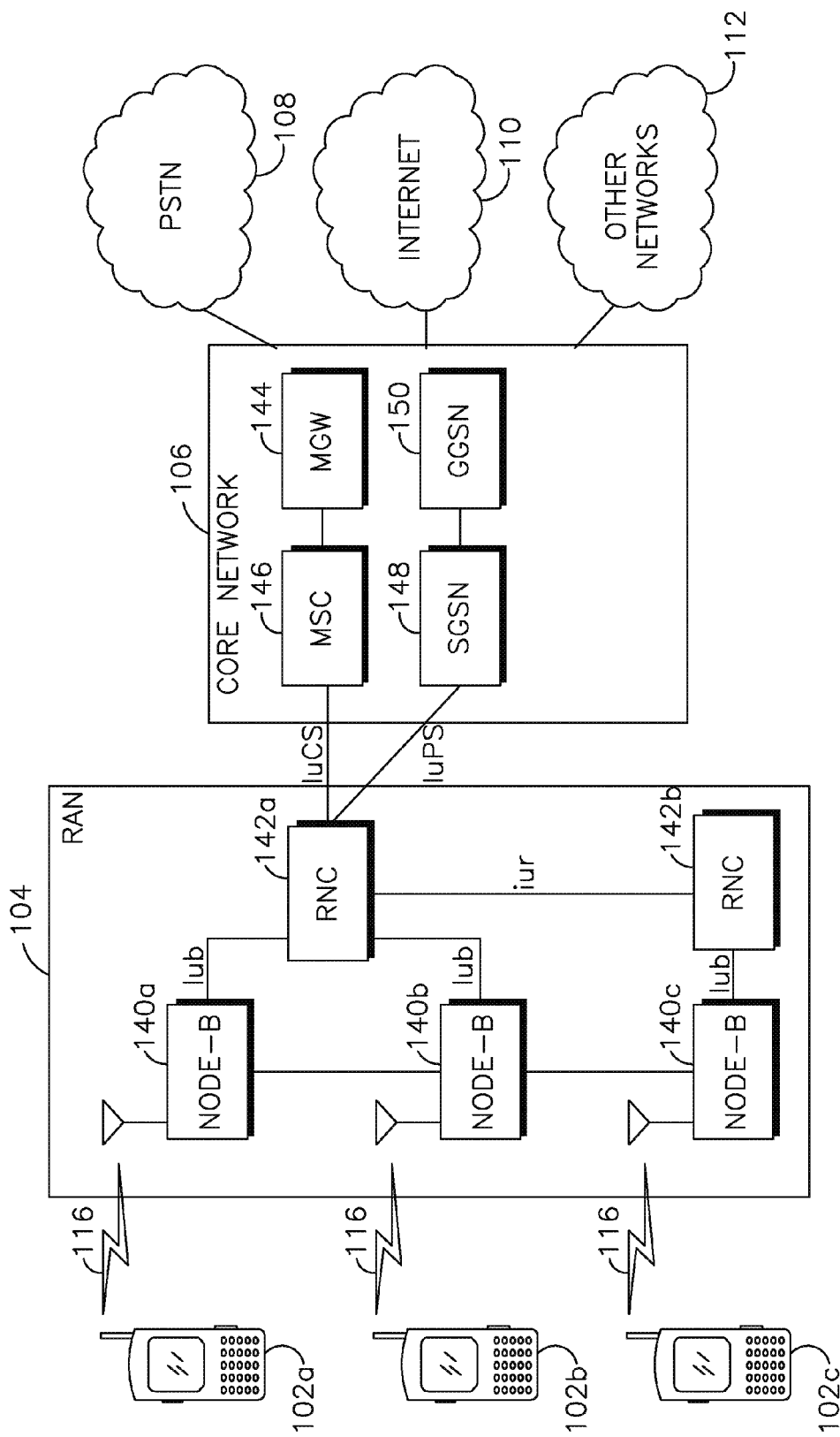
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Content may be any form of digital data. One important form of content with additional constraints on distribution and delivery may be continuous media, (i.e., streaming media).

A content delivery network (CDN) may be a network infrastructure in which the network elements may cooperate at layers 4 through layer 7 for more effective delivery of content to user agents. A CDN may consist of a request routing system, a distribution system, (that includes a set of surrogates), a logging system and a CDN control system.

A content delivery service provider (CDSP) may be a service provider that operates a CDN.

A publisher, (or content service provider (CSP)), may be an entity that provides a content service to an end user. A publisher may own the content made available as part of the content service, or may license content rights from another party.

An end user may be the "real" user of the system, typically a human but maybe some combination of hardware and/or software emulating a human.

An authoritative CDN may be an upstream CDN contracted by the publisher for delivery by this CDN or by its downstream CDNs.

An ingestion interface may be established between the publisher and a CDN, and may be used to upload content and metadata to the CDN.

A CDNI control interface may allow initial secure connection setup and bootstrapping of other interfaces. Other functions may include capability exchange and content purge and pre-positioning.

A CDNI request routing interface may allow the request routing system in interconnected CDNs to communicate to ensure that an end user request may be (re)directed from an upstream CDN to a surrogate in the downstream CDN, in particular where selection responsibilities may be split across CDNs, (e.g., the upstream CDN may be responsible for selecting the downstream CDN while the downstream CDN may be responsible for selecting the actual surrogate within that CDN).

A CDNI logging interface may be used to exchange activity logs, such as those used for charging purposes.

A CDNI metadata interface may communicate content metadata that is relevant to the distribution of the content and have an inter-CDN scope. For example, geo-blocking information, availability (time) windows and access control mechanisms may be part of this CDNI metadata.

Request routing may be different from CDNI routing. Request routing may be used to fulfill a request from an end user, (request routing is a function of CDNs). CDNI routing may be used to route CDNI signaling through one or more CDNs (CDNI Routers).

CDNs may provide content to end users, such as static images or files, streaming content, or interactive services. CDNI may provide interfacing between CDNs including control, request routing, logging and metadata. CDNs may be interconnected to each other using a peer-to-peer CDNI. These CDNs may implement CDNI routing, which enables communication between two CDNs not directly peered with each other using CDNI. CDNI routing may involve more than request routing (RR) messages between CDNs. In particular, logging enables settlements between CDNs linked through CDNI as part of a business relationship.

Figure 2:
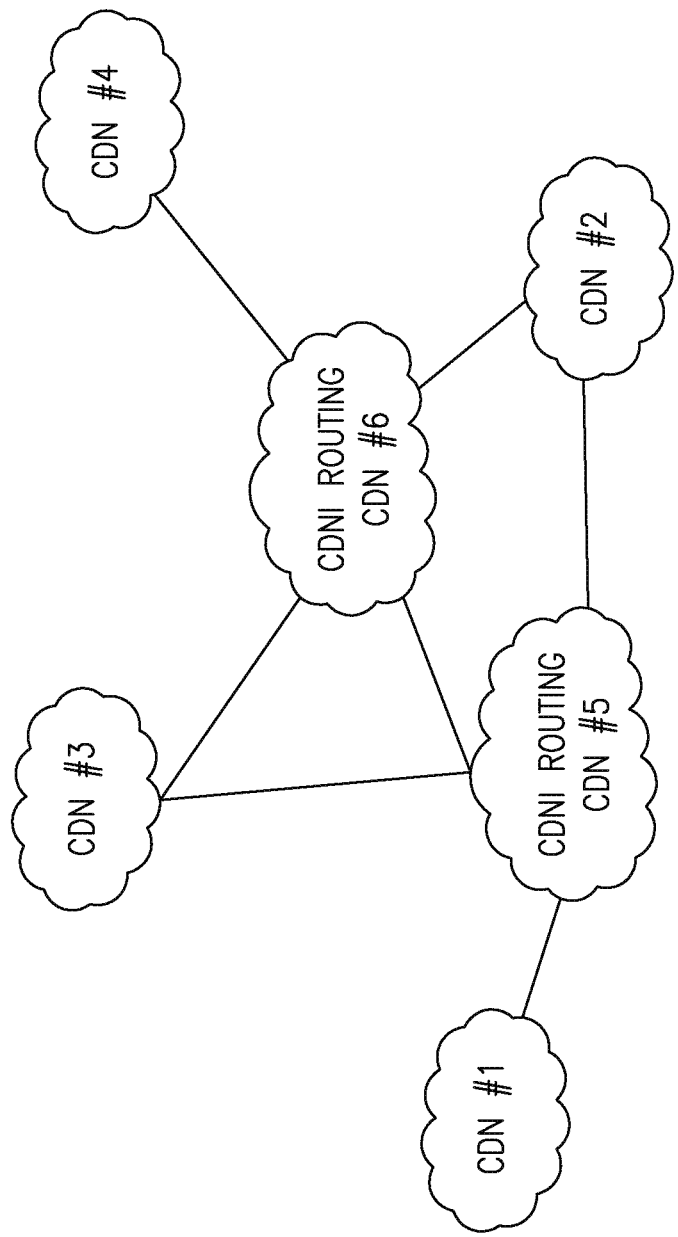
FIG. 2 shows an example of content delivery network (CDN) interconnection (CDNI) routing.

FIG. 2 shows an example of CDNI routing. For example, if CDN #3 delegates delivery to CDN #1 through CDN #5, then there may be a related settlement between CDN #1 and CDN #5, and another one between CDN #5 and CDN #3. Alternatively, CDNI logs may use CDNI routing, enabling a direct settlement between CDN #1 and CDN #3.

Figure 3:
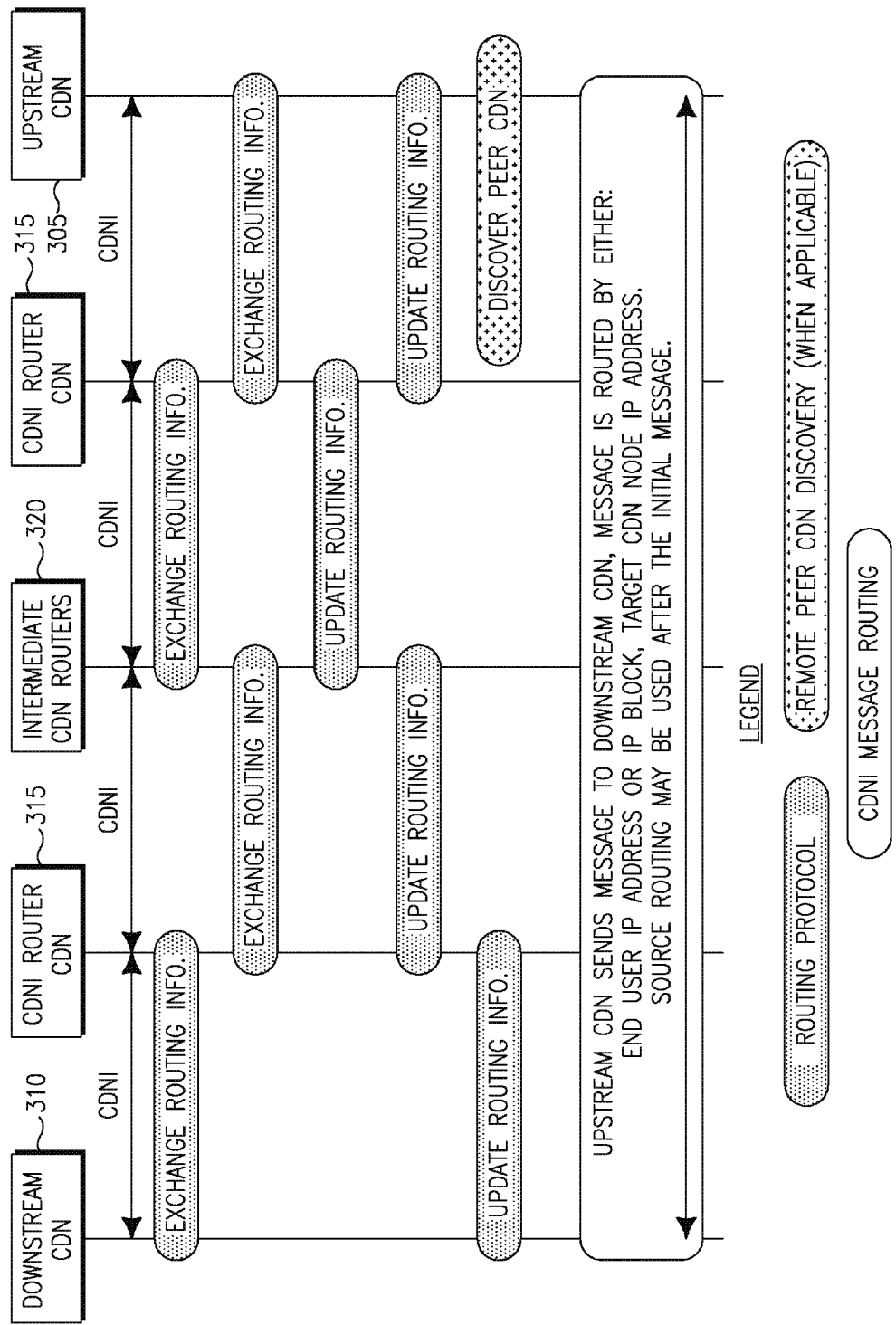
FIG. 3 shows an example of CDNI routing between an upstream CDN and a downstream CDN using fabric setup, discovery and routing phases.

FIG. 3 shows an example of CDNI routing between an upstream CDN 305 and a downstream CDN 310 using fabric setup, discovery and routing phases. The CDNI routing may be performed by one or more CDNI router CDNs 315 and intermediate CDN routers 320. The upstream CDN 305 may send a message to the downstream CDN 310 by using an end user IP address or IP block, or a target CDN node IP address. Source routing may be used after the initial message.

Currently, CDNI is envisioned between two (2) CDNs. A first CDN may decide to delegate a content delivery to a second CDN, which may delegate again to another interconnected CDN). A CDN may decide to delegate to another CDN which it is not necessarily directly interconnected with. Thus, the scope of CDN interconnection may shift from local to global, interconnecting many CDNs within a single content internetwork.

As shown in FIG. 3, the descriptions of those routing methods may include a routing protocol, remote peer CDN discovery, (which is applicable for CDNI-unicast), and actual CDNI message routing. What is common between the various routing methods is that CDNs interconnect with each other using CDNI as part of a business relationship. CDNs having more than one interconnection may provide CDNI routing services to other CDNs. Moreover, some of the interconnected CDNs may be "access CDNs", i.e., CDNs deployed by Internet service providers (ISPs) or mobile network operators (MNOs), and integrated in the operator's network to more efficiently serve this operator's end users.

Figure 4:
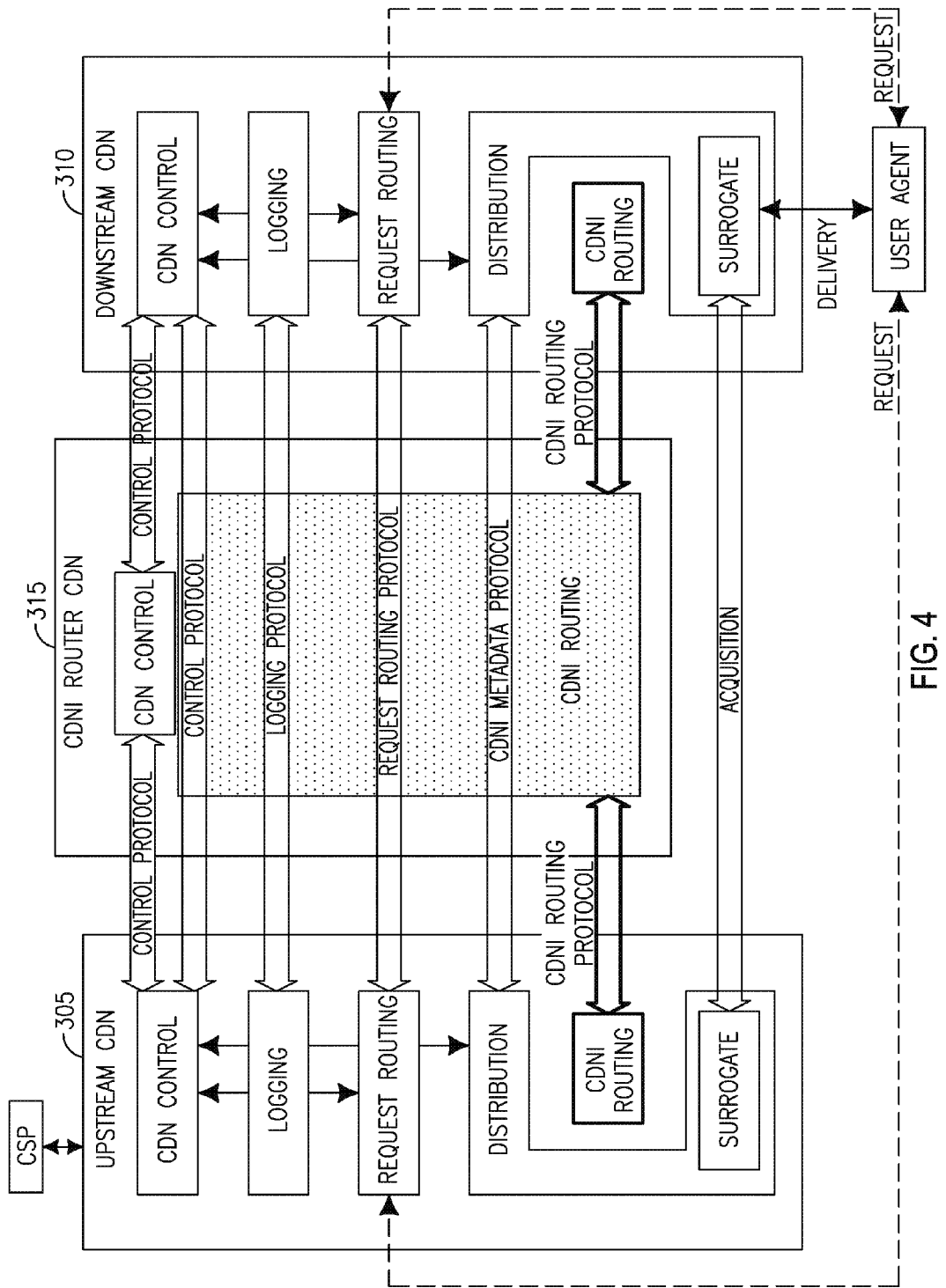
FIG. 4 shows an example of a CDNI routing function within CDNI architecture.

FIG. 4 presents the CDNI routing function within a larger CDNI architecture. A CDNI router CDN 315 may be directly peered with both the upstream CDN 305 and the downstream CDN 310, using CDNI protocol. The upstream CDN 305 and the downstream CDN 310 are not directly interconnected, but may nevertheless exchange request routing, metadata, logs and some control messages, such as content purge request messages, through the mediation of the CDNI router CDN 315. CDNI routing protocol may be used to exchange CDNI routes between interconnected CDN peers.

The CDNI routing function shown in FIG. 4 may support various routing methods, (cdni-local-link, end user based, cdni-unicast, cdni-multicast, cdni-broadcast), peer CDN discovery (in particular for request routing), protocol for CDNI routing, (i.e., routing information exchange between CDNs), protocol for CDNI request routing and access CDN Role. The access CDNs may be able to use a "pull" CDN reselection mechanism.

A CDNI router is an entity interconnected to two (2) or more CDNs using CDNI, and which is able to forward CDNI signaling from one interconnected CDN to another. For example, CDN A may interconnect with CDN B and CDN C. CDN B and CDN C are not interconnected with each other. CDN A provides a "CDNI Routing" service to CDN B and CDN C, in such way that CDN B and CDN C may delegate content delivery to each other, as well as other related CDNI operations, such as exchanging logs.

An access CDN is a CDN deployed by an access provider, such as a cellular network operator or an ISP, in order to better serve the end users of this access provider. In a context where many CDNs are interconnected with each other, (directly or indirectly through CDNI routers), an access CDN may advertise to others "here are all my end users", such as by using IP address ranges. This information may be used to discover "the best CDN" for a given end user.

"End-user-based" routing is a CDNI routing scheme whereby a routing protocol is used to disseminate access CDN end user information to all interconnected CDNs. Furthermore, upstream CDNs and all intermediate CDNI routers may use this information to direct CDNI messages towards the appropriate access CDN for a given end user. In particular, the CDNI messages sent using this routing scheme may be clearly related to a given end user, such as a request routing message associated with an end user originating the content request.

For end-user-based routing, the upstream CDN 315 shown in FIG. 4 may seek out the best peer CDN to deliver a given content to a given end user or set of end users. The actual peer CDN may not be known a priori, but may be discovered through the CDNI routing mechanism. To enable this, access CDNs may advertise over CDNI the set of IP address blocks of their managed end users, (i.e., the end users of the access provider deploying this "access CDN"). CNDI router CDNs may exchange routes to build routing tables which are matching IP address blocks to next hop CDNs.

Examples of use cases where end-user-based CDNI routing is beneficial may include assisting non-global CDNs reach end users world-wide, thus enabling federations of CDNs to compete with global CDNs, and MNOs optimizing network usage by delivering very popular content using multicast solutions such as multimedia broadcast multicast service (MBMS). Further, the authoritative CDN may reach the access CDN most able to guaranty a certain quality of service, since it is integrated in the network of the access provider of a particular end user.

Figure 5:
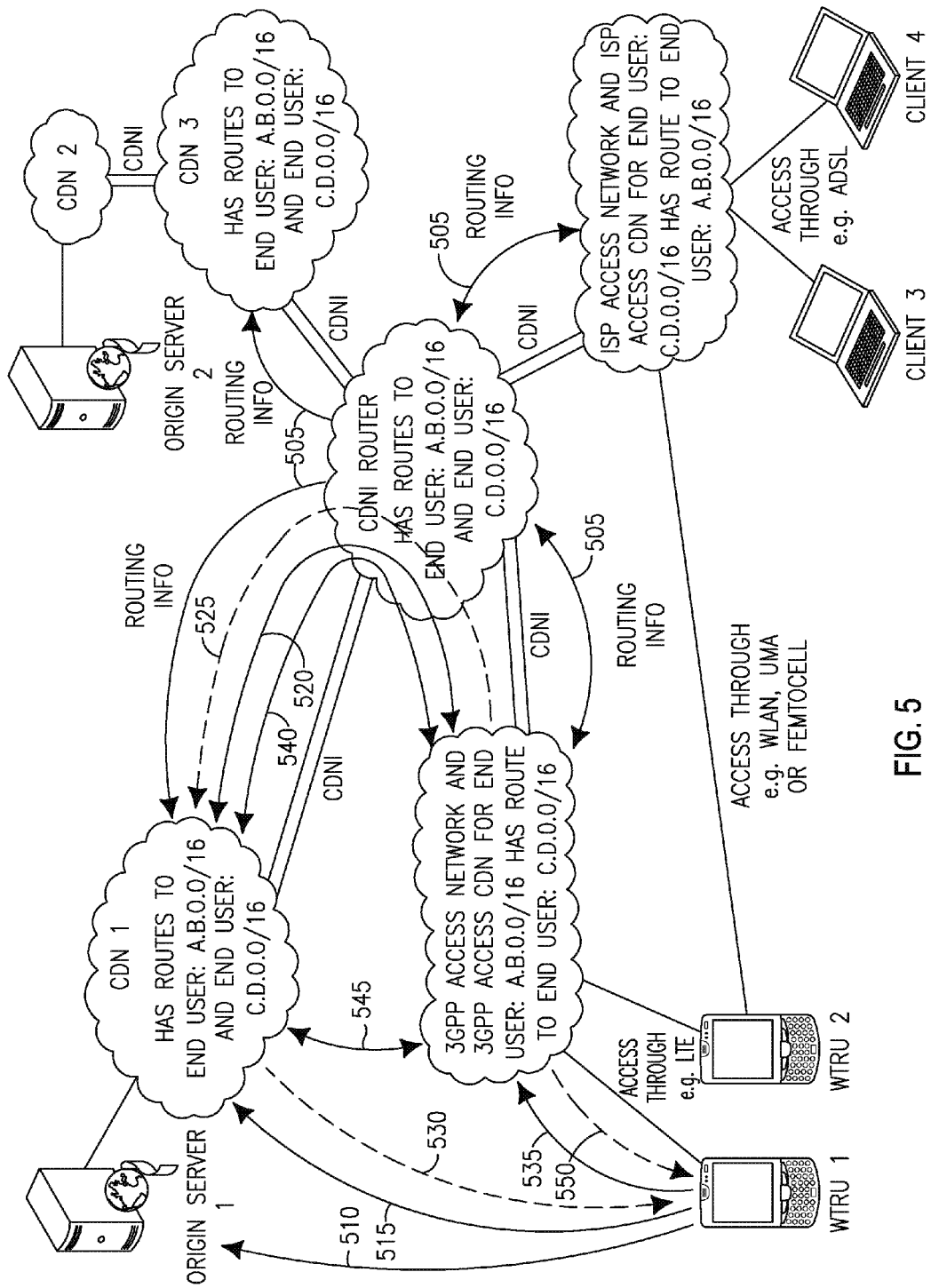
FIG. 5 shows an example of how CDNI end-user-based routing may be used in content request routing.

FIG. 5 shows an example of how CDNI end-user-based routing may be used in content request routing. The end user redirection (especially 520, 515 and 530) may vary depending on the specific implementation of CDN 1. A recursive request routing method may be used, (i.e., the whole procedure takes place between 515-530), but an iterative routing method may be used instead, (i.e., CDN 1 redirects an end user to a CDNI Router, the end user may transmit a request to the CDNI Router CDN, which may redirect to a third generation partnership project (3GPP) access network, and the like). Since typically more than one hop is involved, the recursive request routing method may be the preferred one, to reduce the delivery start up delay and the number of redirections reaching the end customer.

In 505, CDNI routing information may be exchanged over CDNI. Based on this, CDN 1 may know it may reach access CDNs managing A.B.0.0/16 and C.D.0.0/16 through the CDNI router.

In 510, a web browser on WTRU1 may obtain a web page from the origin server, which contains a pointer to an object stored on CDN 1, (e.g., uniform resource location (URL) http://media.example.cdn.com/movie1.mpd pointing to metadata associated with a 3GP-DASH compliant movie).

In 515, WTRU1 may resolve media.example.cdn.com. A domain name system (DNS) request may pass through a local DNS server in the access network (not shown). At some point, the DNS request may reach an enhanced DNS server in CDN1, (actually the local DNS server may successively query several DNS servers, as part of the normal DNS resolution procedure). FIG. 5 shows a single arrow towards CDN1's enhanced DNS server. This enhanced DNS server may initiate the request routing procedure (520 and 525).

In 520, as part of the request routing procedure, a message is sent to the 3GPP access CDN through the CDNI router CDN, to delegate the delivery. This message may be sent because the CDNI router advertised earlier that it had routes to IP address blocks A.B.0.0/16 and C.D.0.0/16. Since the end user local DNS server IP address is within one of these blocks, CDN 1 may send a request-routing CDNI message to the CDNI Router. Based on its own routing table, the CDNI router may forward the message over CDNI to the 3GPP access CDN.

In 525, the 3GPP access CDN may accept and returns the IP address of the selected surrogate. Alternatively, if instead of a DNS based content request (515), a redirection based content request was used, such as by using hypertext transfer protocol (HTTP) GET as the request, and a redirection HTTP 3xx as in the response in 530, then the 3GPP access CDN may return a hostname instead of an IP address.

In 530, the DNS resolution procedure completes with WTRU1 receiving the selected surrogate IP address from CDN 1.

In 535, WTRU1 may then initiate the content delivery, such as by using HTTP GET, to obtain the metadata file. Alternatively, if the IP address returned to the end user in 530 was the IP address of a 3GPP access CDN redirector function instead of a surrogate, then here another redirection to the actual surrogate may occur.

In 540, if needed, the 3GPP access network may obtain metadata from CDN 1 through the CDNI router.

In 545, if needed the surrogate may acquire the content from CDN 1.

In 550, the 3GPP access network surrogate may proceed with the content delivery.

Figure 6:
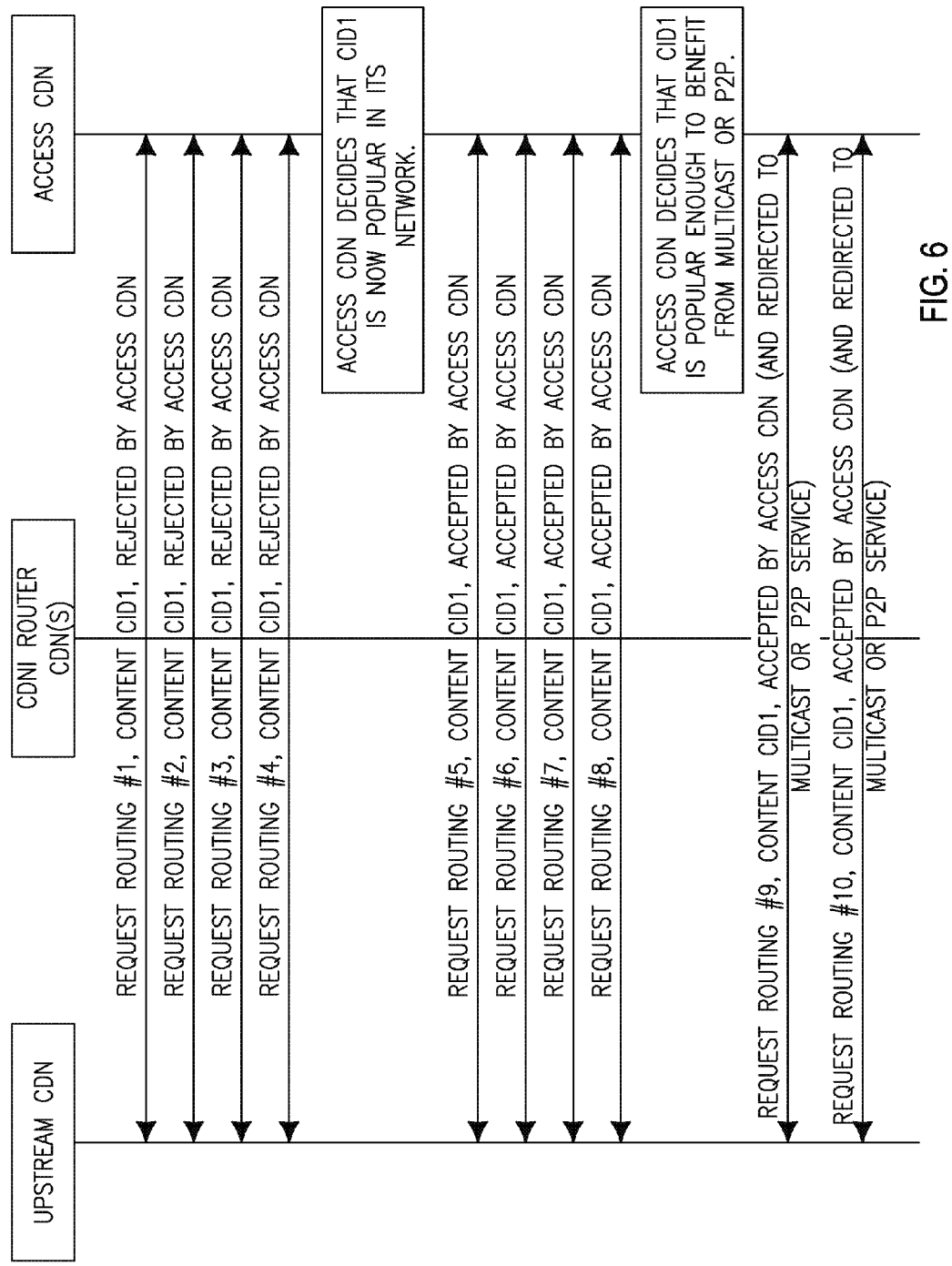
FIG. 6 shows an example of logic used by an access CDN to deliver and aggregate content (without CDN reselection)

If one or more CDNs use systematically, (or at least for popular content), end-user-based routing to delegate deliveries to access CDNs, then access CDNs may be able to take appropriate actions on new deliveries for popular content. For example, if a given content becomes very popular, due to receiving more than n deliveries per second for a given time period, then, assuming that the access CDN turned down the delivery request before that point, the access CDN may decide to perform the delivery itself from this point on, and until the delivery request rate drops. Moreover, the access CDN may also decide, based on the detection of this increased popularity, to distribute the content using a multicast or P2P delivery method, in order to gain in scalability. FIG. 6 illustrates this type of access CDN behavior. In another example, the access CDN may decide to accept to deliver the content originated from a given publisher or from a given authoritative CDN, as part of a business relationship with these entities.

CDNI router CDNs may interconnect with each other and form a content internetwork between access CDNs and other CDNs. When a CDN has the choice to route a message through one of several interconnections, (i.e., between several routes towards the same CDN), it may follow a policy such as shortest route, round robin, or minimize cost. CDNs may exchange route information, (including IP blocks and route length), using CDNI route advertisement messages.

Figure 7:
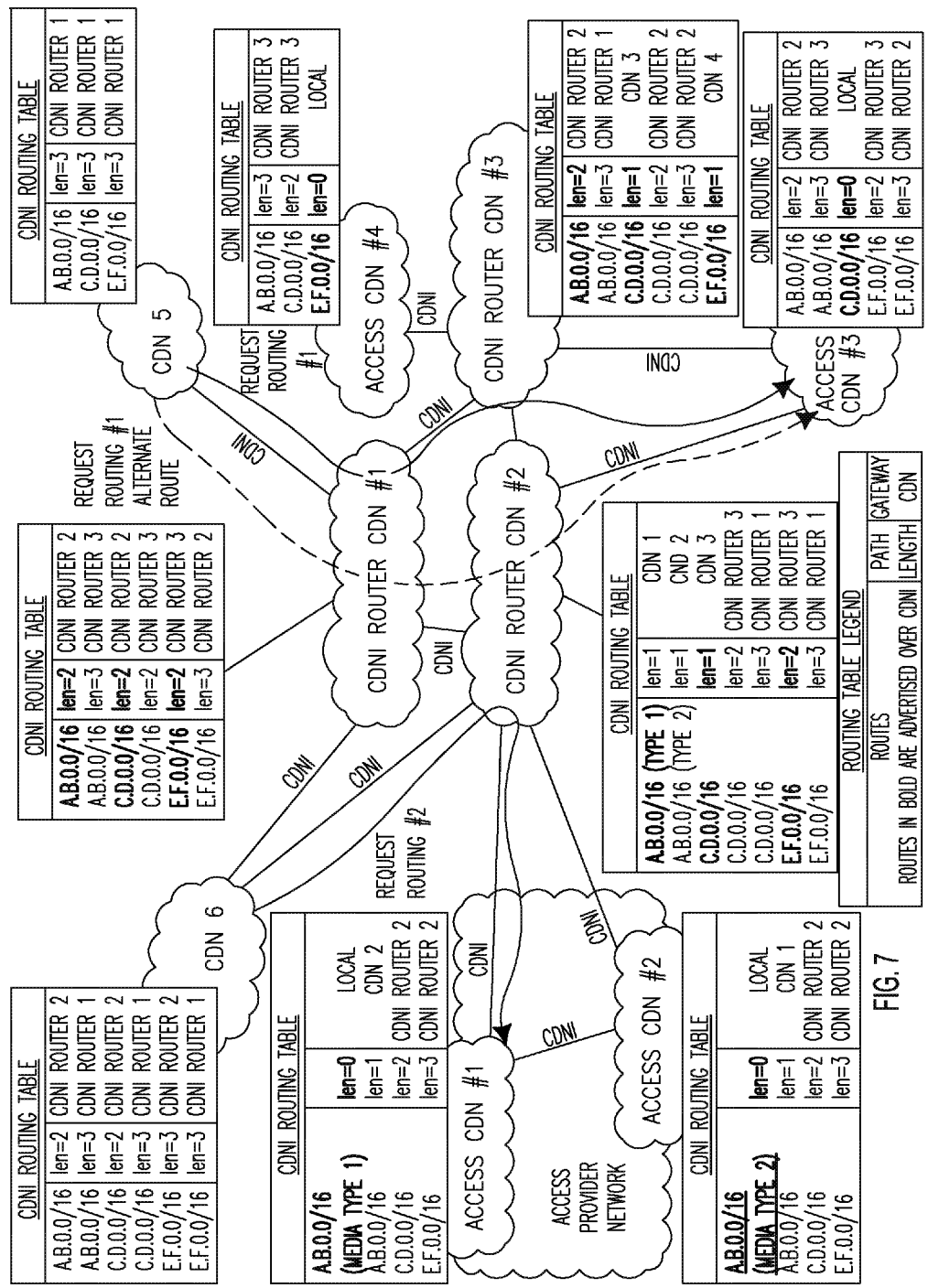
FIG. 7 shows access CDN routing and content interworking architecture.

FIG. 7 shows resulting routing tables in a content internetwork in steady state. To limit the size of the routing tables, a CDNI router CDN may only advertise to its peers a single route towards a given IP block, (selected among other routes using the shortest path or using another algorithm). Additionally, a CDNI router CDN may also decide not to advertise any route with a path length larger than a threshold.

Several "sibling" access CDNs may cover the same range of end users. For example they may share the same IP blocks and only differ in the type of media served, or even share load them. These sibling access CDNs may interconnect with the same CDNI router(s), and have an agreement with the CDNI router(s) to split the traffic according to pre-determined rules. In FIG. 7, CDNI Router #2 may split CDNI traffic to access CDNs #1 and #2, depending on the media type mentioned in the request routing message fields. Another valid example would be to have CDNI router #2 split the load according to the hash of the content ID, (such a hash-based load balancing algorithm is for example used in the cache array routing protocol (CARP)).

While this mechanism bears resemblance with IP based routing, (e.g., border gateway protocol (BGP)), CDNI routing may either build over protocols such as BGP, or alternatively be completely distinct from it and operate at a higher layer. The CDNI router CDN may communicate with other CDNs through gateways which are IP end points, and when a CDNI message is forwarded, it may be sent towards a destination CDN node using the IP address of one of the CDN gateways as the destination. A CDNI message header may be present in CDNI messages, inside the IP payload, (e.g., inside the HTTP payload, encoded as javascript object notation (JSON) or extensible markup language (XML)). The CDNI routing function may use the routing method field of this header to determine which routing method to use, (end-user-based, CDNI-unicast, and the like), and then depending on this method, other fields maybe used to lookup in the appropriate CDNI routing table.

Because of the possible settlements between CDNs, the chain of intermediate CDNI routers may be maintained unmodified for related messages, (e.g., for all messages related to a certain content). Source routing may be used. An initial message, (e.g., the first message related to a given content ID), may be sent, and the route may be recorded in the message by CDNI routers on the way, (similar to via header usage in session initiation protocol (SIP)). Any further messages, (e.g., logs), related to the same content may be sent with the pre-recorded route included in the message. CDNI routers may use this information to route the message. This method is known as strict source routing and is used in IP and SIP.

Figure 8:
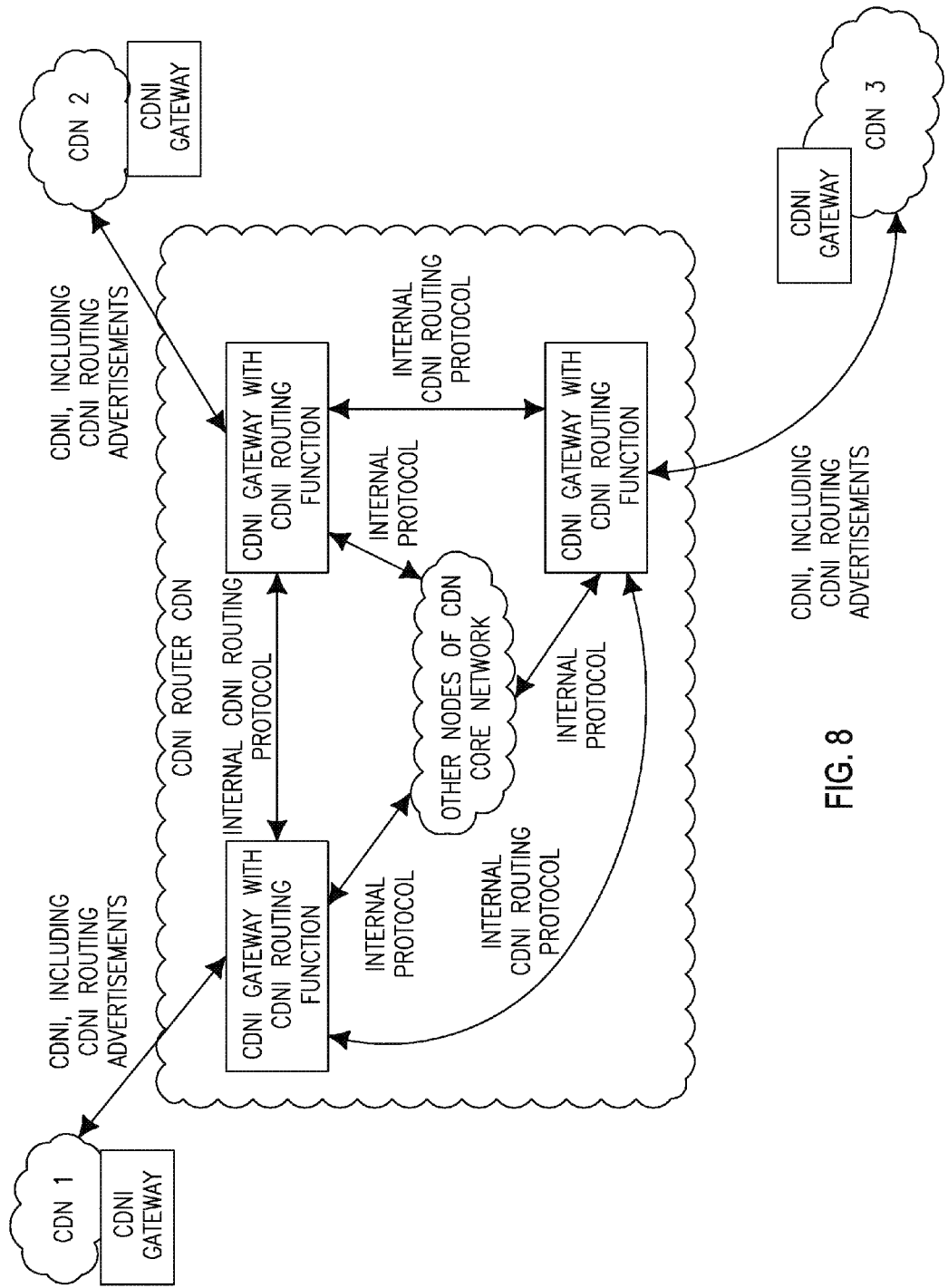
FIG. 8 shows a portion of the internal architecture of a CDNI router CDN (focusing on CDNI routing function)

Since CDNI routers are generally distributed entities, (they may typically be full-blown CDNs), an internal routing protocol mechanism may be used inside the CDNI router in order to merge input from various interconnections, in a manner similar to the internal border gateway protocol (IBGP). FIG. 8 presents how several interconnections are terminated in different CDNI gateways in a CDNI router. Gateways may be connected to each other and exchange CDNI routing information, in such a way that the CDNI router as a whole may act as a single entity with one routing table. An example of implementation for this internal protocol is to use CDNI route advertisements in order to synchronize routing tables between all the CDNI gateways of the CDNI router.

Figure 9:
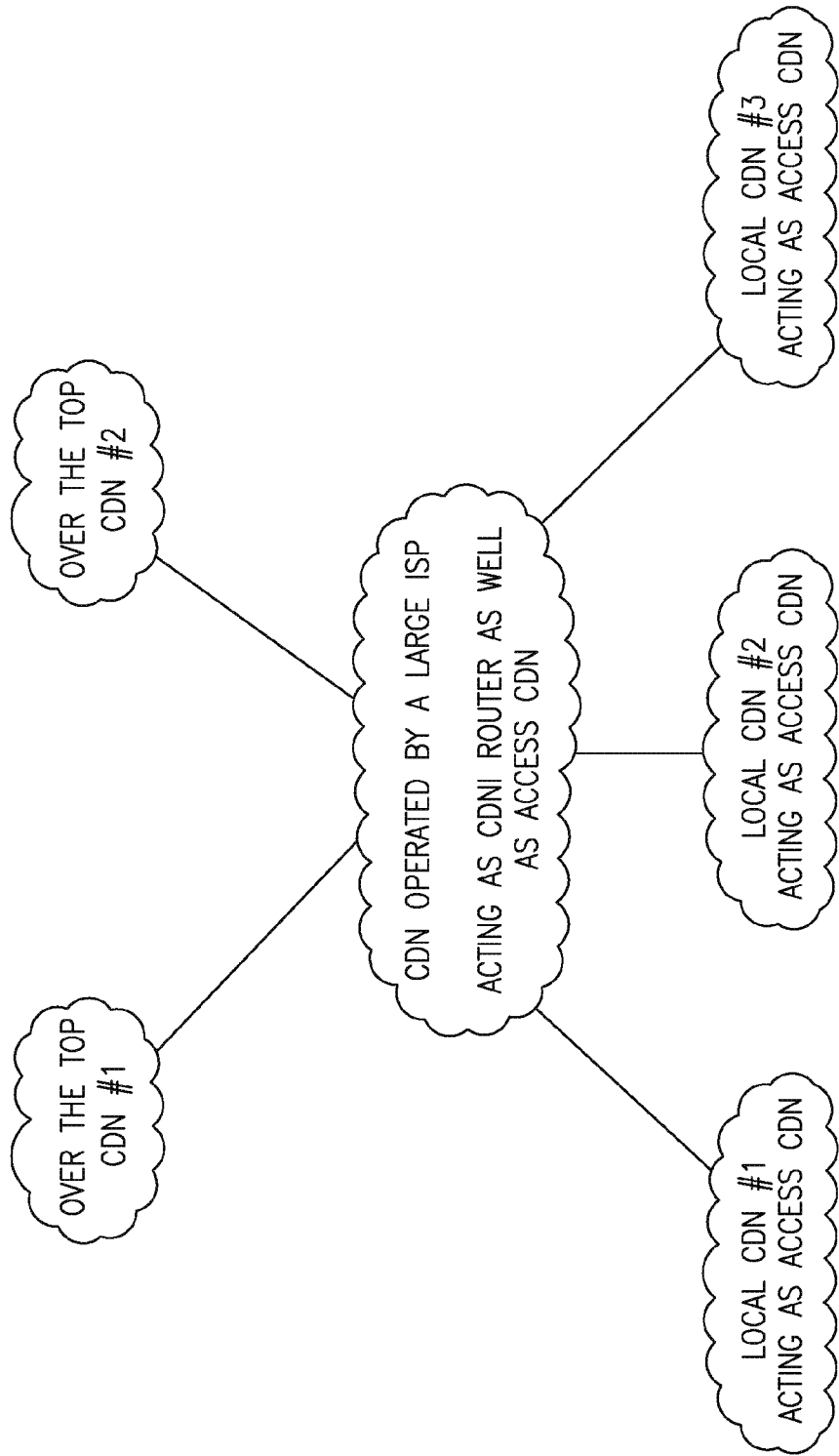
FIG. 9 shows an example of deploying a CDNI router and access CDN.

In one example of deployment, a global CDN, (e.g., Akamai, Limelight), may act as a CDNI router for CDNs it interconnects with. In another example of deployment, several local ISPs, (deploying their own CDNs), may be federated under a larger ISP's CDN acting as a CDNI router, as shown in FIG. 9. For example, a cable operating following CableLabs' specifications may act as a CDNI router for other cable networks.

In an alternate deployment scenario, existing public Internet routers, (such as the BGP routers between autonomous systems (AS)), may be overlaid with CDNI gateways. For example, BGP routers may support a new CDNI gateway function, or alternatively, a CDNI gateway may be deployed at Internet interconnection points beside a BGP router. In this scenario, a CDN may interconnect with CDNI gateways located at the border of the AS where its core network is located, even if some of its surrogates are located outside of this AS. A CDN distributed over several AS may decide to interconnect with CDNI gateways located in all or some of the AS it covers.

MNOs using IMS may decide to deploy an access CDN in their IMS network. A deployment option available to interconnect this access CDN with other CDNs may be a session border controller (SBC), which is a network-based entity that may be deployed at the borders of different service provider networks used in a peering environment to control signaling and media setup. Moreover, the SBC may be deployed to delineate operator access and backbone networks. In 3GPP IMS architecture, the functionality of the SBC at the entry/exit point may be carried out by interconnection border control function (IBCF). CDNI routing messaging and the media relaying functionality carried out by CDNI Gateway may be mapped into the IBCF. Namely, at the demarcation point, the IBCF itself or an interworking function (IWF) interoperating with the IBCF may handle CDNI routing. Similar deployments may also be valid for telecommunications and Internet converged services and protocols for advanced networks (TISPAN) architecture. This functionality distribution may let the 3GPP operator clearly identify the relationships between its access CDN network and other 3GPP or non-3GPP operator (say IPTV network) CDNs.

Figure 10:
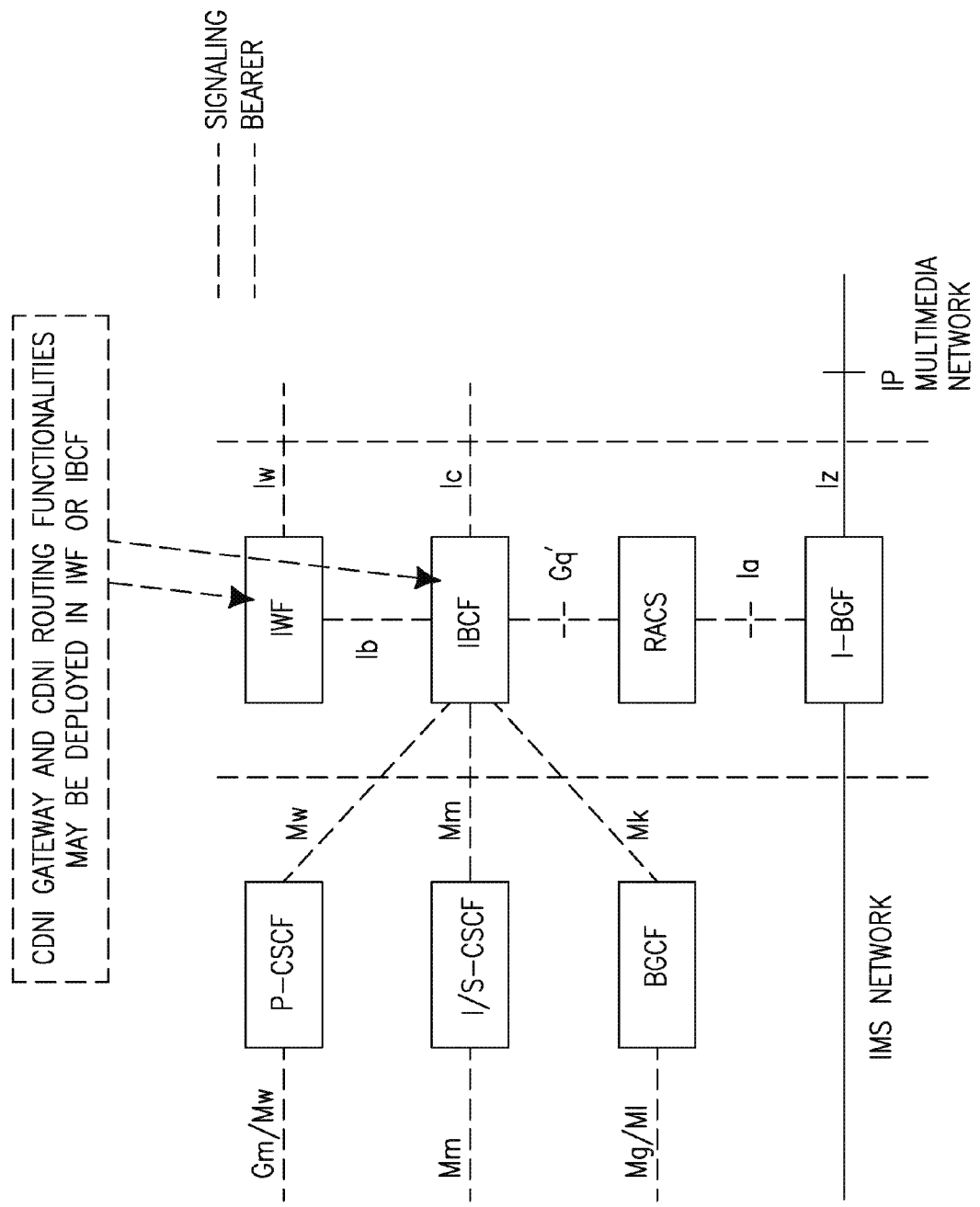
FIG. 10 shows an Internet protocol multimedia subsystem (IMS) to external IP multimedia network interworking reference architecture.

Examples of CDNI interconnection may include IBCF-to-IBCF (using SIP to encode CDNI between 2 IMS-based CDNs), or IWF-to-any CDNI gateway (using HTTP-based CDNI between an IMS based CDN and a non-IMS CDN). FIG. 10 shows an Internet protocol multimedia subsystem (IMS) to external IP multimedia network interworking reference architecture. FIG. 10 shows the relationship between an IBCF, an IWF, an IMS network and an external IP multimedia network. CDNI routing signaling may be terminated by the IWF or the IBCF A new CDNI routing advertisement message may be part of a new CDNI routing application programming interface (API). Using this message, an access CDN may advertise its end users, (a set of IPv4 or IPv6 address blocks), and a CDNI router may advertise routes towards end users of an interconnected access CDN. This information may be exchanged at initial CDNI connection time between CDN peers, and may be later updated when needed. Other CDNs that do not have the roles of access CDN or CDNI routers may not advertise route information, but may receive it from others. Upon reception of a route advertisement, a CDN may fill or update an end-user-based CDNI routing table. A CDN may maintain several routes towards the same or intersecting IP blocks. A routing decision between these routes may be based on a shortest path, lowest cost, failover or other policy. A CDN may reject advertisements it is not willing or able to use. CDNs may use capabilities exchanged using a CDNI control API to indicate to each other if they support the CDNI routing API.

A peer-to-peer CDNI link may be based on a pre-existing trust relationship between peers. This trust relationship is important to ensure that access CDNs properly declare their end users, and that the CDNI router properly advertises routes with correct path length.

Figure 11A:
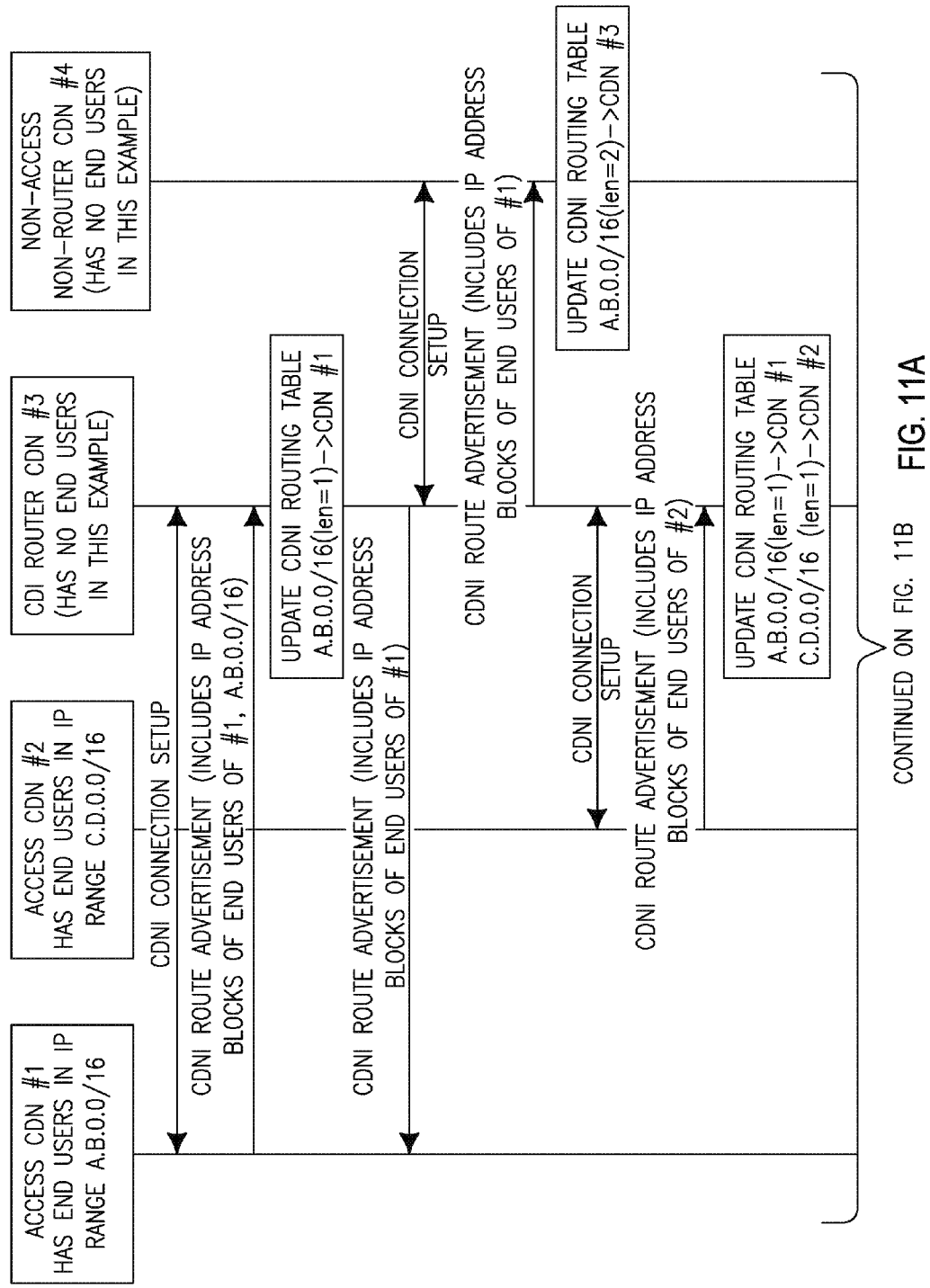
FIGS. 11A and 11B show an example of end-user-based route advertisement through a CDNI router and directly between access CDNs.
Figure 11B:
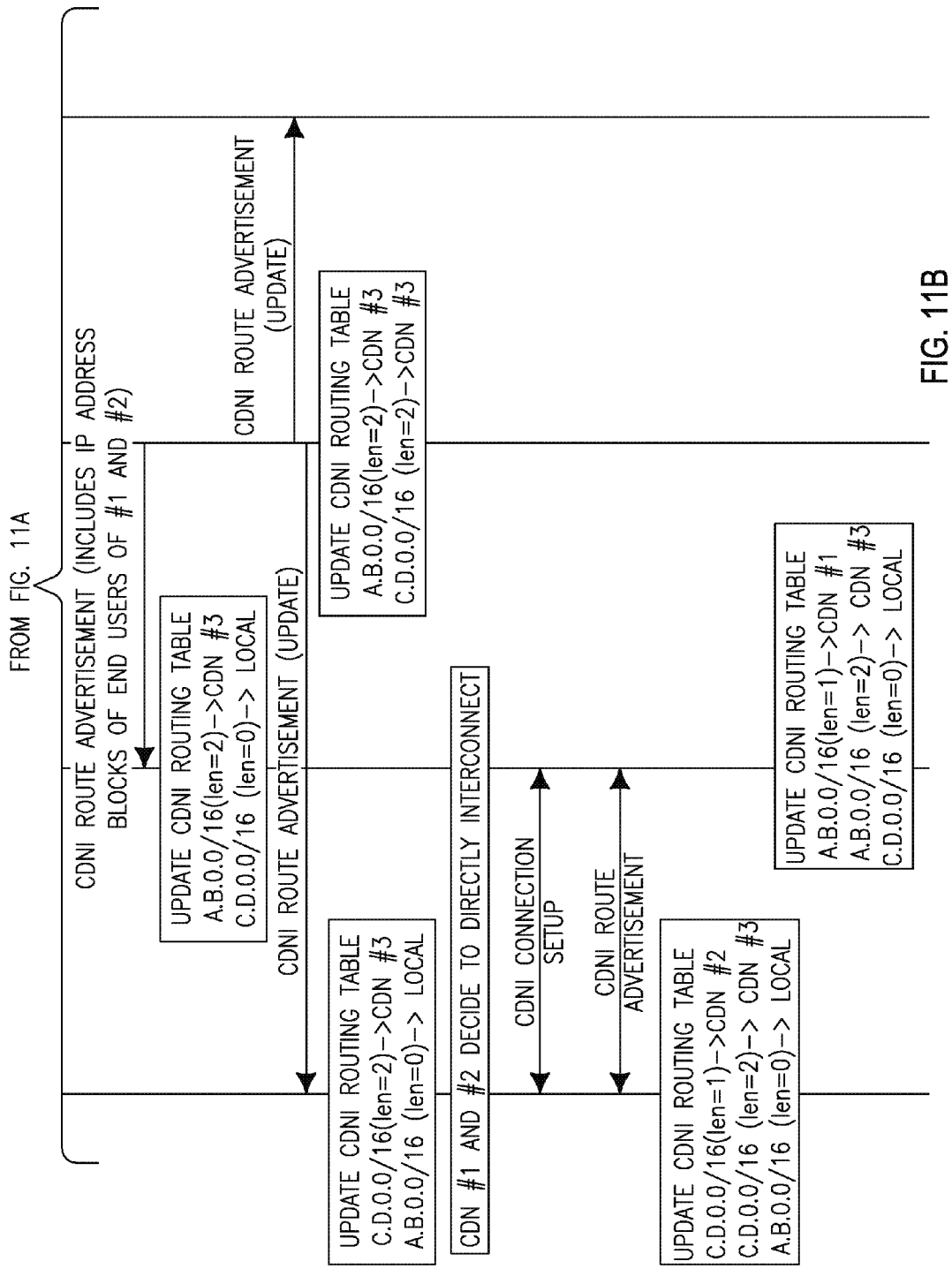

FIGS. 11A and 11B show an example of end-user-based route advertisement through a CDNI router and directly between access CDNs. A CDNI route advertisement is a new CDNI message that may be encoded using XML or JSON over HTTP, or use other encoding, (e.g., BGP extension). CDNI route advertisement various fields including a sender CDN ID, (e.g., a domain name), an "update" flag, set for subsequent updates after a first initial advertisement, and a set of route entries, each having an IP address block, (e.g., IPv4 or IPv6), path length in number of hops, additional parameters such as weight, which may provide additional input to select between several routes, and additional policy parameters on this route, (e.g., a flag indicating that the access CDN at the extremity of this route wishes to be included in all request routing procedures to its end users). CDNs may build and maintain a new software entity, (i.e., an end-user-based CDNI routing table), including a set of routing entries, each having an IP address block, (e.g., IPv4 or IPv6), path length in number of hops, additional parameters provided in CDNI route advertisement, and next hop CDN ID.

A CDN request routing procedure may takes place when an end user sends a content request. If the authoritative CDN uses a DNS-based redirection method, the content request may take the form of a DNS request for a fully qualified domain name (FQDN), for which a CDN is authoritative. Alternatively, if the CDN is using an HTTP redirection method, the content request may be the initial HTTP GET directed to the origin server or to the authoritative CDN redirector function. Content requests may also take other forms, (e.g., SIP INVITE). The content request may reach the authoritative CDN request routing function, which is in charge of identifying a proper surrogate and redirecting the end user towards this surrogate. The request routing procedure may include inter-CDN communication to delegate the delivery to another CDN. This procedure may cascade to one or more CDNs.

An upstream CDN starting a request routing procedure may check the end-user-based CDNI routing table and determine that there is an access CDN serving the end user of the content delivery. The upstream CDN may involve this access CDN in the procedure, (e.g., because the CDNI routing table entry contained a flag requesting this behavior for this entry). The upstream CDN may then build a CDNI request routing message and send it to the next hop indicated by the CDNI routing table selected entry. Every intermediate CDNI router may route the message according to its end-user-based CDNI routing table. Every intermediate CDNI router may update the request by adding its CDN ID in the message, (to enable source routing to be used for the CDNI response, and is similar to the via SIP header). Finally, the message may reach the access CDN, which may determine whether or not to deliver the content. When building the response, the access CDN may copy over the recorded route information from the request, which may be used by the intermediate CDNI routers to forward this response along the same route taken by the request.

Figure 12:
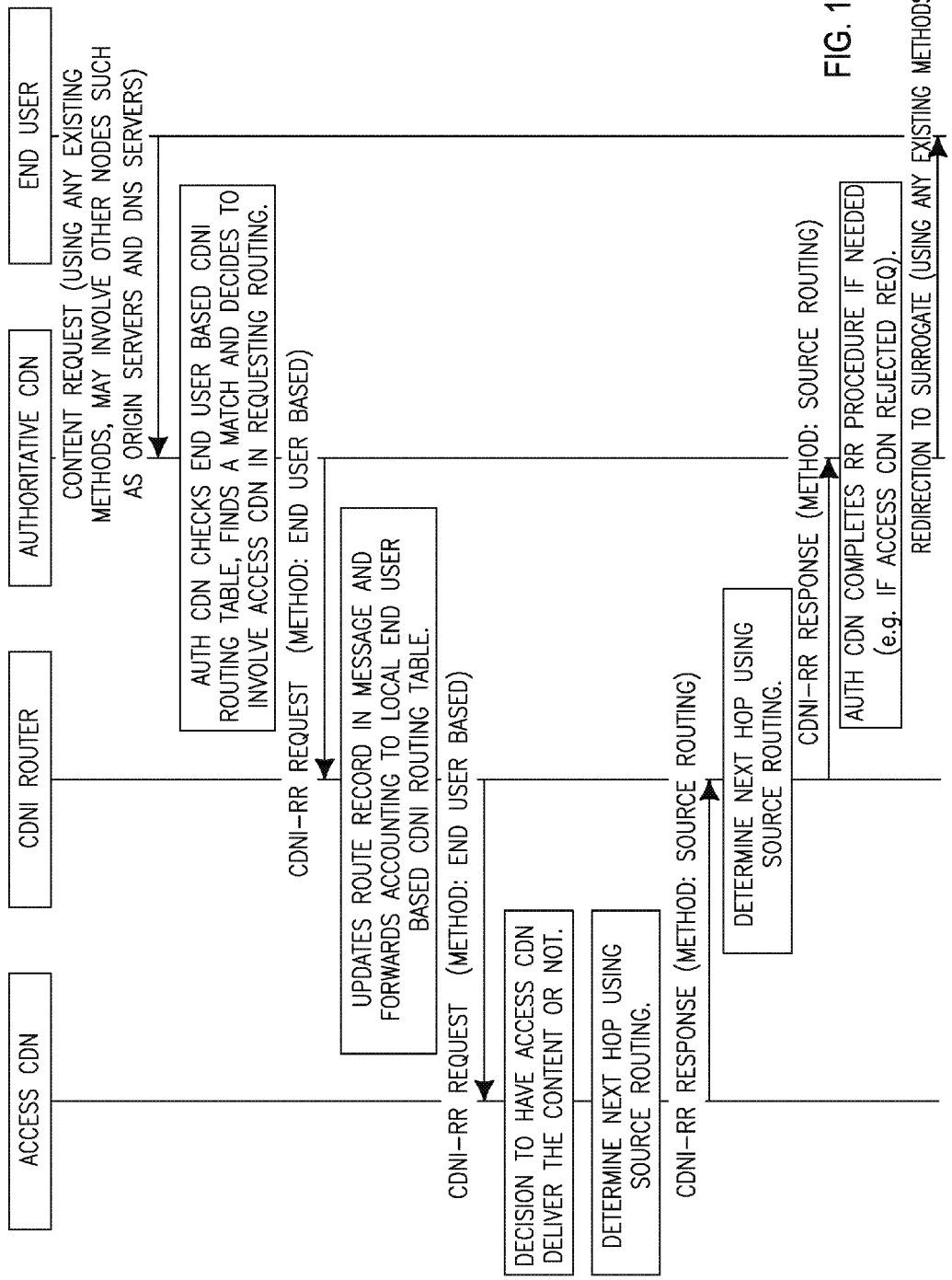
FIG. 12 shows an example of request routing call flow.

FIG. 12 shows an example of request routing call flow. These new CDNI request routing messages may be encoded using XML or JSON over HTTP, or use other encoding. Moreover, a generic CDNI Message header may be present in all CDNI messages and used for CDNI routing purposes.

A CDNI message header may indicate a routing method by using a code indicating how this message is to be routed. For example, in a link-local method, no CDNI routing is to be performed on this message, in end-user-based CDNI routing, CDNI routing may be performed by finding the best match of the end user IP address, (present in another field in this message), within the end-user-based CDNI routing table, and source-routing where the sender and subsequent CDNI routers find themselves in the recorded route (present in the message), and then forward the message to the next CDN in the recorded route.

A CDNI request header may indicate a destination CDN using an identifier of the final destination of the message (e.g., a domain name), which is omitted when the destination is unknown, (e.g., when end-user-based CDNI routing is used).

A CDNI request header may indicate a source CDN, (in the request it should be the same as the authoritative CDN). A CDNI request header may indicate a message ID, (this is a unique ID within the scope of a given Source CDN). For example, the sender may increment an internal counter by one for every message sent.

A CDNI request header may indicate a recorded route using a list of CDN IDs recording intermediate CDNs in the path, which are adding their ID when forwarding a message, (this is to enable routing of the response and to detect routing loops).

A CDNI request header may include a time-to-live (TTL) field, (an alternative to avoid routing loops).

A CDNI request-routing request (REQ) message may include a CDNI message header and delivery identification (authoritative CDN ID, content ID and end user ID such as an IP address (or its local DNS server IP address if not available).

A CDNI request-routing response (RSP) message may include a CDNI message header (destination and source CDNs may be properly reversed, and the recorded route may be copied over from the request, possibly in reversed order), delivery identification (same fields as in REQ), and a decision to deliver (Yes/No).

CDNI-unicast routing and service-based CDN discovery procedure may be implemented as follows. A source CDN may desire to reach a specific destination CDN, which it may be directly interconnected with. The destination CDN itself is known, and the routing does not depend on the end user location. This destination may be known "a priori" by the source CDN, or alternatively a discovery mechanism may be used to determine the best destination CDN, (typically, to determine the best CDN to use for a given delivery). Thus, this procedure has a routing side, (covering routing fabric setup and the routing itself), and a destination CDN discovery side.

CDNs connecting to a CDNI router CDN may provide set(s) of IP address blocks of its own nodes, (typically, public IP addresses directly used by the CDN operator). CDNs may exchange routing information, whereby IP blocks are not end user IP blocks, but CDN core network IP blocks, non-router CDNs may advertise their own local IP block(s), (two (2) non-router CDNs may interconnect this way), CDNI routers may advertise both their own local IP block(s) and IP blocks they can route to, and the access CDN role is not relevant here.

A CDNI-unicast routing table may be maintained by interconnected CDNs based on CDNI route advertisements. This routing table may be distinct from the end-user-based CDNI routing table, but since the IP address space of the end users and CDN core networks is typically the same public IP address space, there may not be a practical reason to keep them separated. The CDNI-unicast routing table may alternatively use CDN IDs instead of IP addresses, in which case the routing tables may remain distinct from each other.

For a CDNI routing advertisement, the IP address blocks may belong to CDN Core networks instead of access CDN end users. A CDNI-unicast routing table may have the same fields as an end-user-based CDNI routing table. The IP address blocks may belong to CDN Core networks instead of access CDN end users. Alternatively, the CDNI-unicast routing table may be populated with CDN IDs (such as domain names) instead of IP addresses.

Figure 13A:
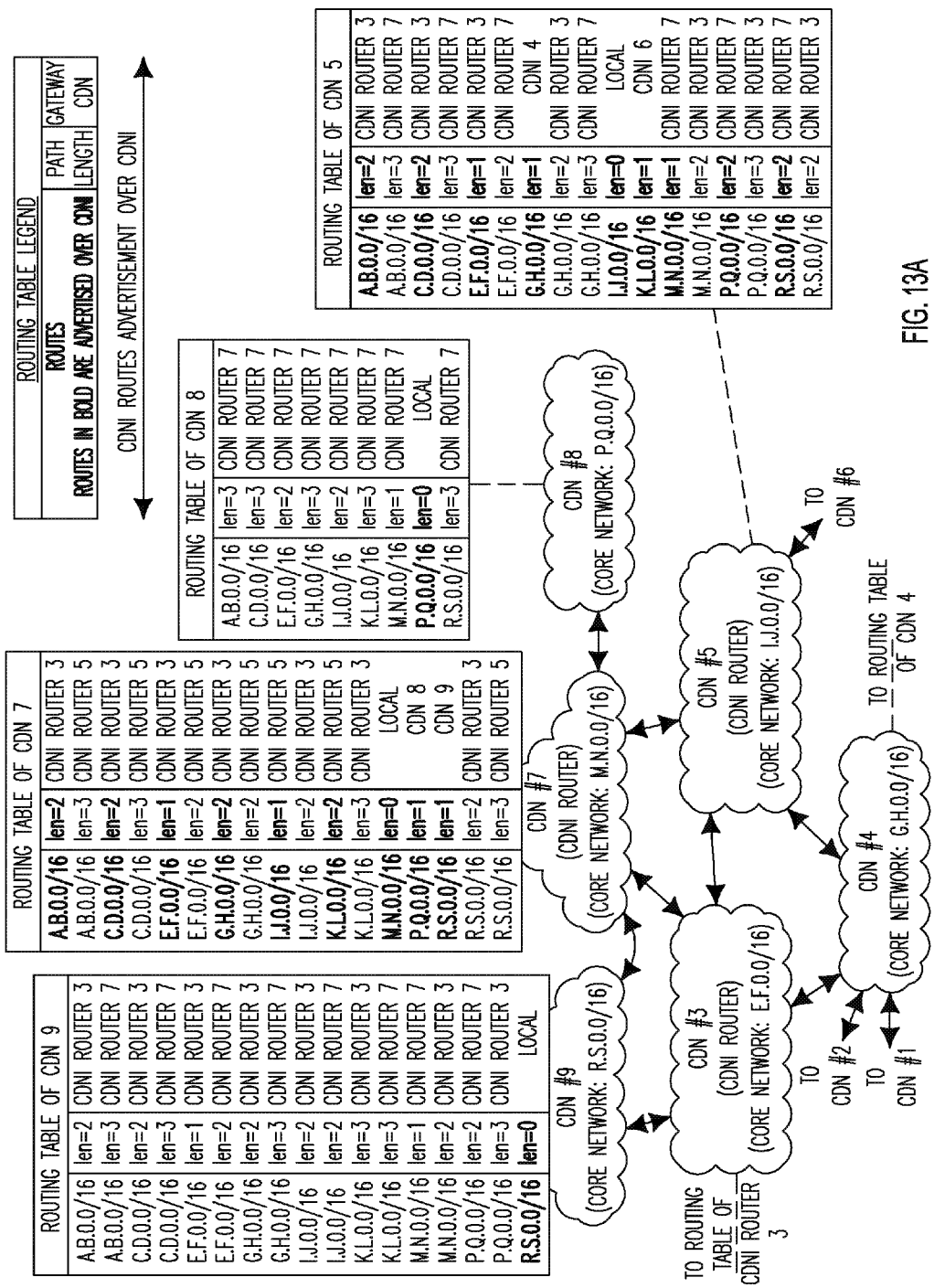
FIGS. 13A and 13B show a content network using CDNI-unicast routing.
Figure 13B:
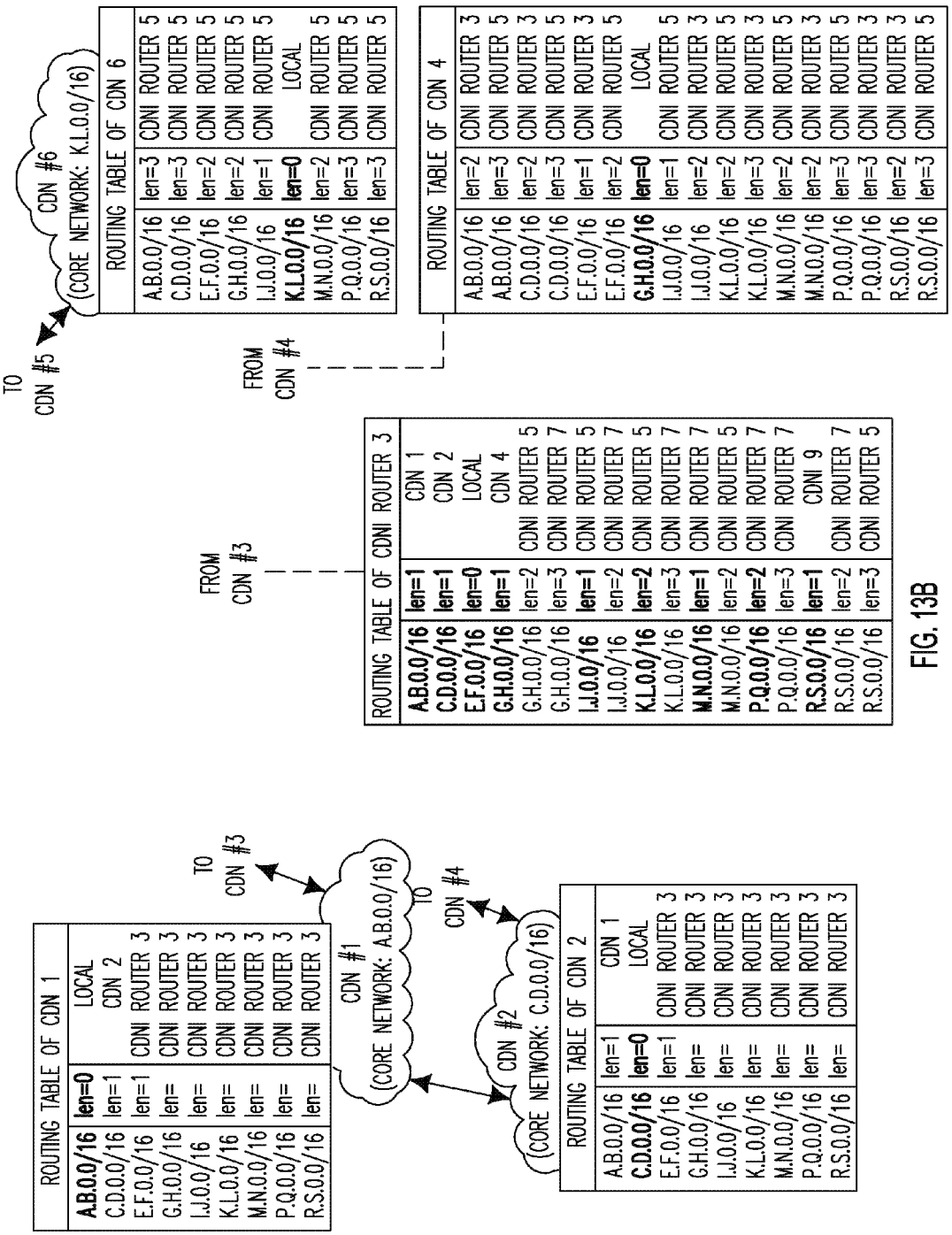

FIGS. 13A and 13B show a content network using CDNI-unicast routing. Routing tables are represented at steady state.

CDNI messages may use a new routing method field value CDNI-unicast. A response message and other related messages may use either source routing or CDNI-unicast routing. The advantage of source routing is that may guaranty that the same route may be used for all related messages. The CDNI message header may be updated to support CDNI-unicast.

The routing method for the CDNI message header may be updated with a new method whereby for CDNI Unicast, CDNI routers may forward this message to the next hop from the best matching routing entry in the local CDNI unicast routing table, (using a destination IP address for lookup). If no match is found in the routing table, the message may be dropped. New fields may be added including a CDNI destination IP address (e.g., IP address of a CDNI gateway or other CDNI core network node of the destination CDN), and a CDNI source IP address, (used by receiver to reply if needed). Alternatively, these last two new fields may be replaced with CDNI destination/source CDN IDs, (such as domain names).

Destination CDN discovery may be performed in various ways, including offline provisioning, external discovery service and discovery messages using CDNI multicast or broadcast. The source CDN may be provisioned with destination CDN IP address blocks or IDs, based on pre-agreements or simply an offline mapping decision. Alternatively, an external discovery service may be used to register and query CDNs. For example, application-layer traffic optimization (ALTO) may be used for this purpose. ALTO may be used for surrogate selection inside CDNs, and ALTO server interconnection is proposed for CDNI. A higher level mapping may be used, whereby a list of potential CDNs may be returned in response to a query for deliver content of a given type, to given end users, and other parameters. Based on this information, a CDN may then initiate a request routing procedure with the returned CDN(s).

Figure 14:
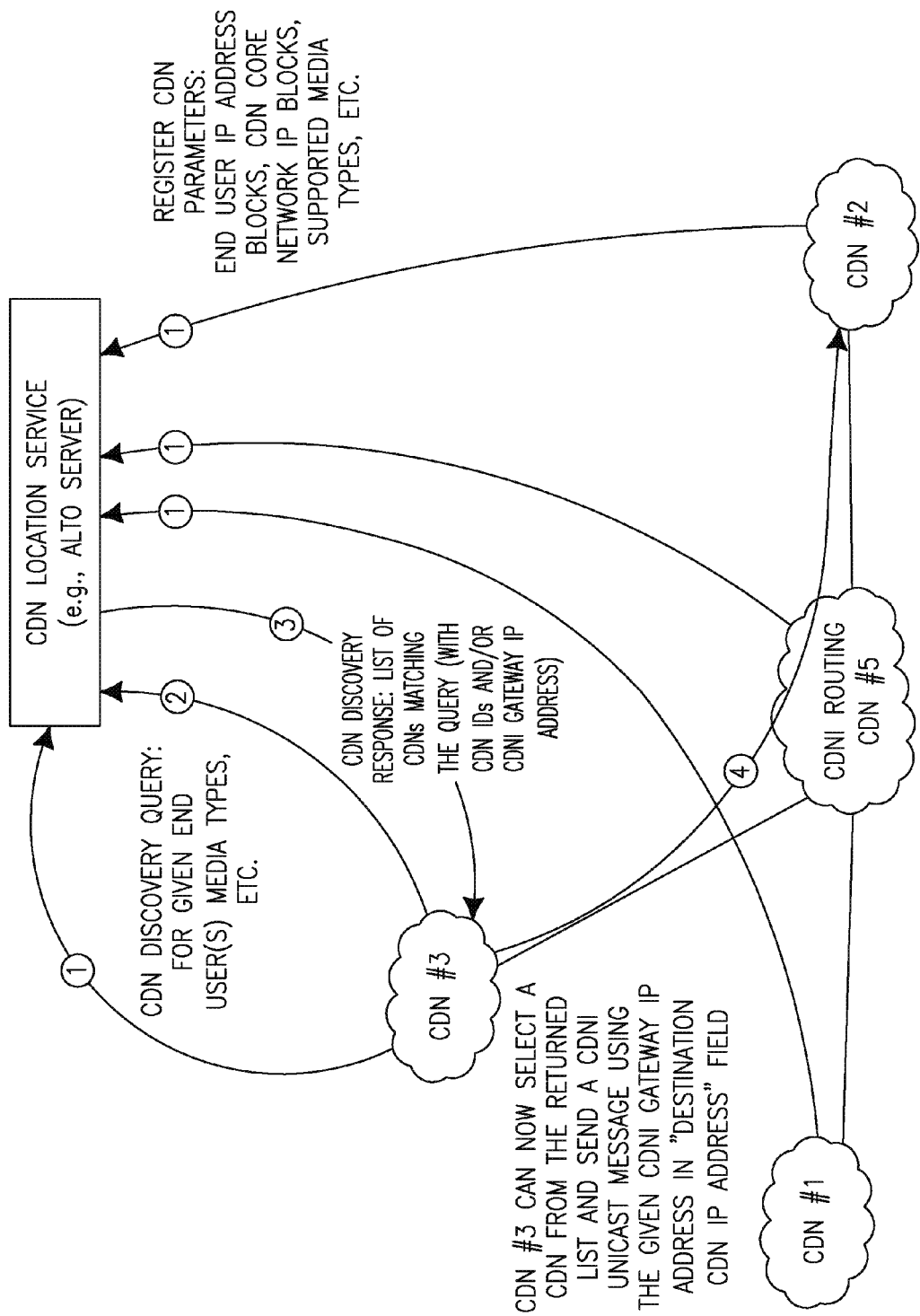
FIG. 14 shows an example of usage for a CDN location service.

FIG. 14 shows an example of usage for a CDN location service, whereby peer discovery may use an external discovery service. CDN registration and discovery messages are shown in FIG. 14. These messages may be non-CDNI messages, (e.g., ALTO messages sent to a third party operated server), or alternatively may be sent over CDNI using CDNI routing, (e.g., location service hosted by one of the interconnected CDNs).

A CDN discovery message may be used by the source CDN to obtain one or more candidates. This discovery message may use end-user-based multicast or broadcast CDNI routing methods. The discovery message response may contain information about the CDN footprint, supported media types, and the like.

A CDNI peer discovery REQ message may include a CDNI Message Header and distribution parameters, (i.e., what are the characteristics of the content distribution such as end user IP address range, media type, and the like. If this is present, receiver CDNs may limit the scope of their response to these parameters, (e.g., they may reject the request if they don't support the given media type).

A CDNI peer discovery RSP message may include a CDNI message header, a return code (accept/reject whereby, instead of using reject, the response may be omitted when CNDI multicast or CDNI broadcast is used for the request), and distribution parameters, (i.e., what are the characteristics of the content distribution acceptable for this CDN, such as end user IP address range, media type, and the like.

Figure 15:
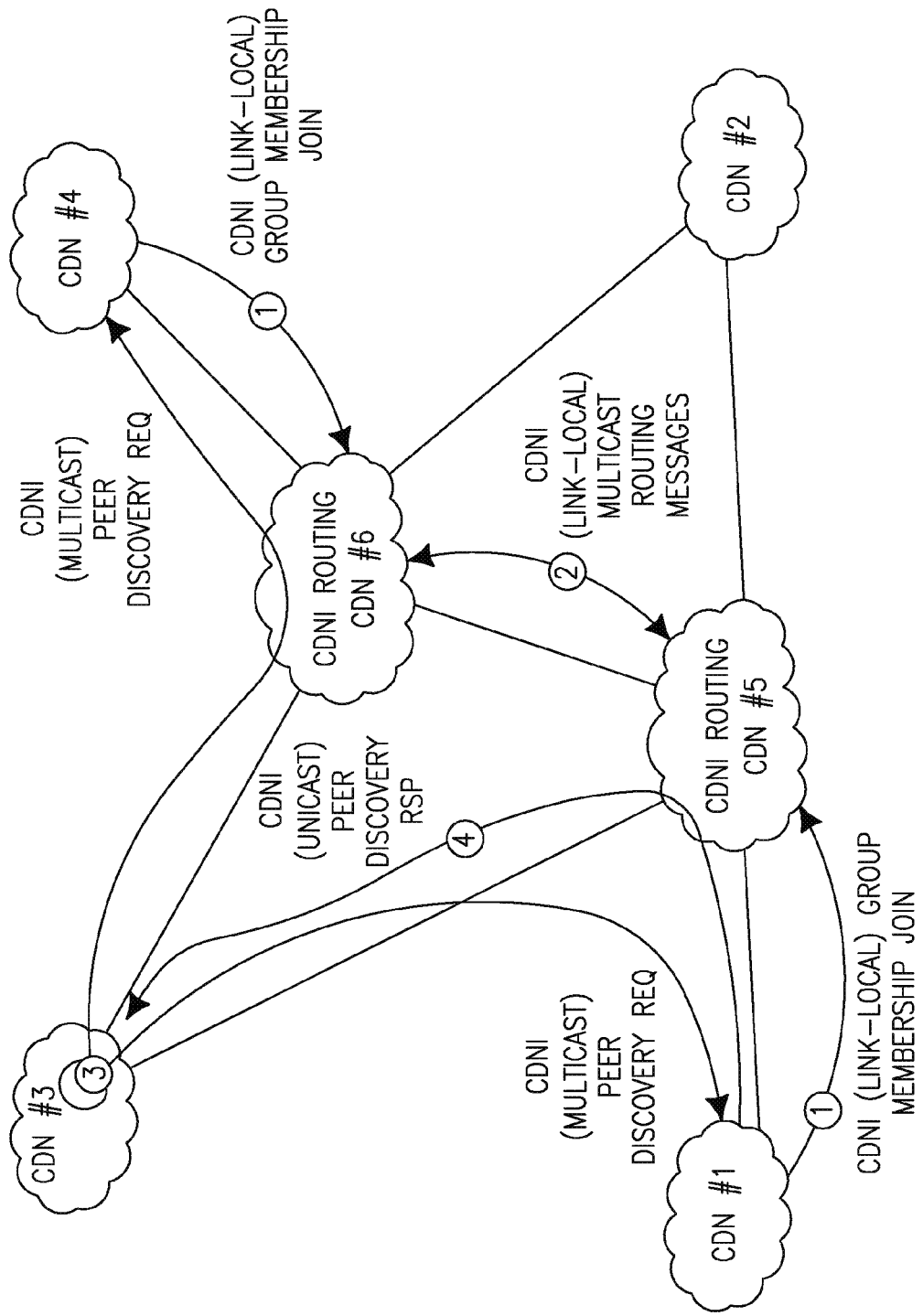
FIG. 15 shows an example of CDNI multicast scenario where CDNs may join a group and another CDN may send a discovery request to the group.

FIG. 15 shows an example of CDNI multicast scenario where CDNs may join a group and another CDN may send a discovery request to the group. FIG. 15 presents an example of peer discovery using CDNI peer discovery messages and multicast.

Figure 16:
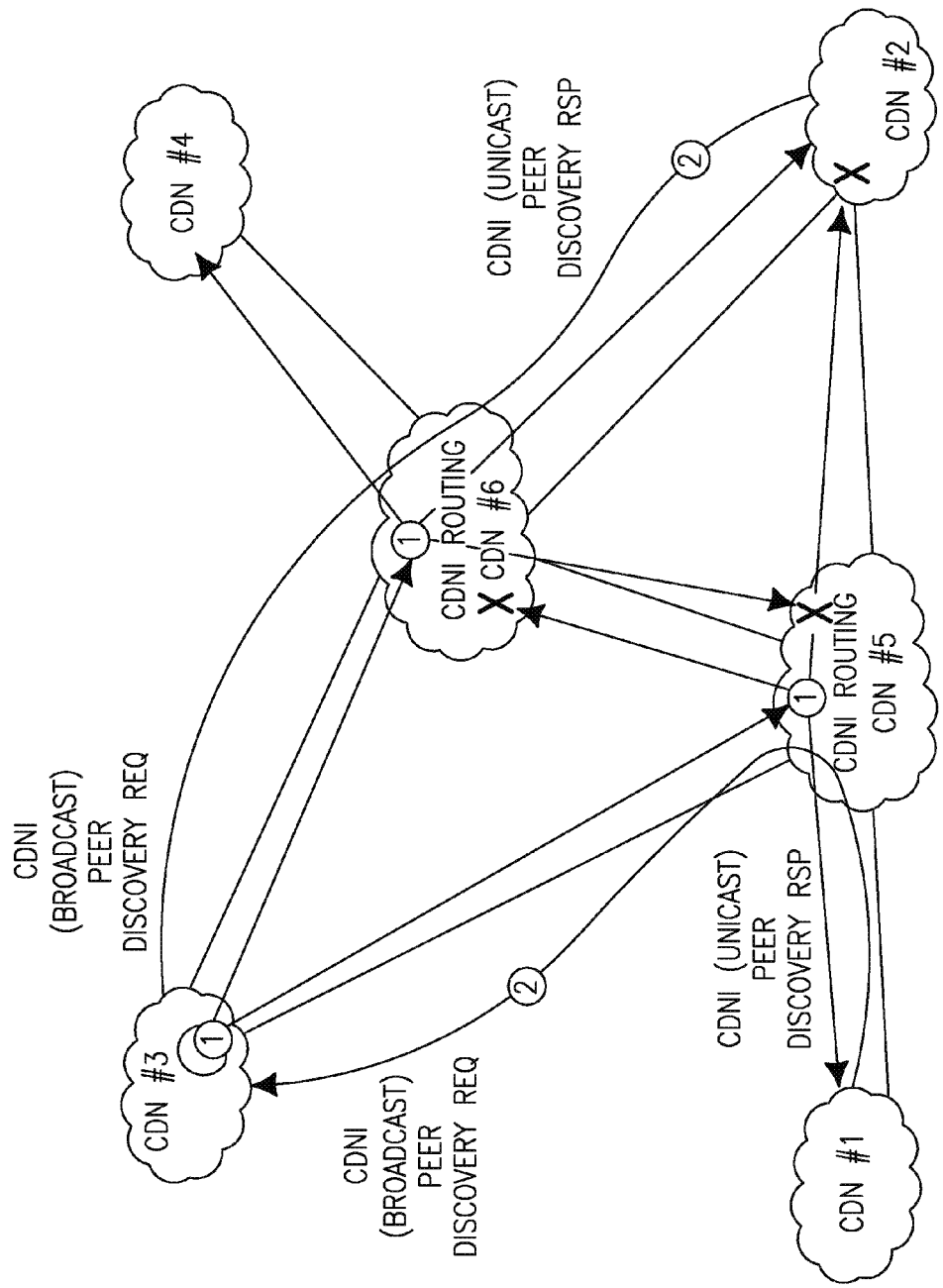
FIG. 16 shows an example of a CDNI broadcast scenario where a CDN sends a CDNI broadcast discovery request.

FIG. 16 shows an example of a CDNI broadcast scenario where a CDN sends a CDNI broadcast discovery request. FIG. 16 presents an example of peer discovery using CDNI peer discovery messages and broadcast.

In CDNI-multicast routing, the upstream CDN may desire to reach a given group of CDNs that provide group membership information to the CDNI router CDN they interconnect with. When exchanging routing information, the CDNI router CDNs may include group membership as well. CDNI messages with the CDNI routing method "CDNI-multicast" may be sent towards a group, (new CDNI message field) and may be duplicated as necessary by CDNI routers to reach all members of the group. CDNI responses and further related messages may be sent using the CDNI-unicast routing method.

A new CDNI message for CDNI group membership management, (this message may be part of the new CDNI "routing" API), may include a CDNI message header, (routing method "link-local" may typically be used), a join or leave command, and a group ID, (e.g., a string or an IP address). To avoid clashes, a global registry of existing multicast groups may be used. Alternatively, IP addresses may be used as group ID.

For example, a CDN may join a "Canadian" multicast group. All interconnected CDNI Routers may end up obtaining a route towards members of this group. An authoritative CDN may send a discovery message to this group to get a list of connected CDNs able and willing to distribute content in Canada. Typically, any CDN may decide to join a multicast group by sending a join message over CDNI to a CDNI router peer. Group membership may be spread between CDNI routers using CDNI messaging. For example, a CDNI protocol based on protocol independent multicast sparse-mode (PIM-SM) or distance vector multicast routing protocol (DVMRP) may be used.

A new CDNI message to transport CDNI multicast routing messages (this message may be part of the new CDNI "Routing" API) may include a CDNI message header, (routing method "link-local" may typically be used. A multicast routing message may be encapsulated, (e.g., based on PIM-SM or DVMRP).

The CDNI message header may be updated to support CDNI-multicast. The routing method may be updated with a new CDNI multicast method whereby CDNI routers may forward this message towards all CDNs which joined this group, and include a destination CDNI multicast group field.

For CDNI-broadcast routing, the upstream CDN may desire to reach any CDN willing to deliver the content, (within other constraints as specified in the CDNI request routing message). For example, the message may reach all CDNs within a limit of n hops. This type of message may be useful to implement discovery schemes or for urgent network-wide alarm messages. The CDNI message header may be updated to support CDNI-Broadcast. The routing method may be updated with a new CDNI broadcast method whereby CDNI routers may forward this message towards all other interconnected CDNs, while avoiding loops using mechanisms such as reverse path forwarding (RPF), message time-to-live (TTL) field, or duplicate detection using the message ID.

The routing decision may be based on the content ID, (i.e., a piece of information uniquely describing a piece of content, within the scope of the content internetwork). For example, such a content ID may be composed of the concatenation of a global CDN ID of the authoritative CDN for this content, (e.g., a domain name), a publisher ID provided by the authoritative CDN, (e.g., an account number), or by the publisher, (e.g., a domain name), and a string provided by the publisher for this particular piece of content.

CDNI routers may compare the content ID present in the CDNI header with an internal content routing table storing content IDs (or set of content IDs) advertised by CDNs, and forward the message towards all matching recipients. Alternatively, a CDN may forward the message towards one matching recipient (e.g., the closest), instead of all recipients. For example, some CDNs may advertise their interest in delivering content from a particular publisher, (e.g., Youtube). These CDNs may receive routing requests using the content ID based routing method (and may reply using the source routing method).

A new CDNI message part of the new CDNI "routing" API may include a CDNI content ID based routing message. The routing method "link-local" may typically be used. The message may include a set of content IDs the sender CDN is interested in delivering. If the content ID is structured, wildcards may be used to designate all content from a given publisher and/or a given authoritative CDN.

The CDNI Message Header is updated to support content ID based routing. The routing method may be updated with a new method using CDNI Content ID Based Routing, whereby CDNI routers may forward this message towards all CDNs advertising this content.

The various embodiments described herein may be used concurrently on the same routing fabric. The CDNI message header field "routing method" may be set by the sender, depending on the need, and every CDN on the path may perform CDNI routing based on the method specified in this field.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed:

1. A method for use in a content delivery network interconnection (CDNI) router, the method comprising:
    establishing a connection with a first content delivery network (CDN);
    establishing a connection with a second CDN;
    receiving, from the first CDN, a first CDNI route advertisement message which includes at least a set of end-user Internet protocol (IP) address blocks, wherein the set of end-user IP address blocks includes IP addresses of end users accessible via the first CDN;
    updating an end-user-based CDNI routing table based at least in part on the set of end-user IP address blocks; and
    transmitting a second CDNI route advertisement message to the second CDN, wherein the second CDNI route advertisement message includes at least a portion of the end-user IP address blocks of the updated end-user-based CDNI routing table.

2. The method of claim 1 wherein the first CDNI route advertisement message and the second CDNI route advertisement message each include a content identification (ID) in a CDNI header.

3. The method of claim 2 further comprising:
    comparing the content ID in the first CDNI route advertisement message with a content routing table that stores content IDs; and
    transmitting the second CDNI route advertisement message to at least one matching recipient indicated by the content routing table.

4. The method of claim 1 wherein the first CDNI route advertisement message and the second CDNI route advertisement message each include a respective set of routing entries.

5. The method of claim 4 wherein each route entry includes an end-user IP address block, a path length in number of hops, parameters used to select a route, and policy parameters associated with the selected route.

6. The method of claim 1 wherein the end-user-based CDNI routing table stores a set of routing entries.

7. The method of claim 6 wherein each route entry includes an end-user IP address block, a path length in number of hops, parameters used to select a route, policy parameters associated with the selected route, and a next hop CDN identification (ID).

8. The method of claim 1 further comprising:
    determining the popularity of content based on delivery requests received by at least one of the first and second CDNs; and
    distributing the content using a multicast or point-to-point (P2P) delivery method based on the determined popularity.

9. The method of claim 1 wherein one of the first and second CDNs is an upstream CDN and the other CDN is a downstream CDN.

10. The method of claim 1 wherein the CDNI router is a CDN.

11. The method of claim 1 wherein at least one of the first and second CDNs is an access CDN.

12. A content delivery network interconnection (CDNI) method for use by an upstream content delivery network (CDN), the method comprising:
- receiving a content request message at an upstream CDN from an end user;
- accessing an end-user-based CDNI routing table to determine whether there is an access CDN serving the end user, wherein the end-user-based CDNI routing table includes Internet protocol (IP) addresses of end users;
- generating a CDNI request routing message;
- transmitting the CDNI request routing message to at least one next hop indicated by a selected entry in the CDNI routing table, wherein (i) the at least one next hop is at least one CDNI router, and (ii) the CDNI router updates and forwards the CDNI request routing response message to the access CDN; and
- receiving a CDNI request routing response message.

13. The method of claim 12 wherein the CDNI request routing message includes a CDNI message header indicating a routing method code.

14. The method of claim 13 wherein the routing method code indicates whether or not CDNI routing is to be performed on the CDNI request routing message.

15. The method of claim 13 wherein the CDNI message header identifies a destination CDN and a source CDN.

16. The method of claim 13 wherein the CDNI message header includes a time-to-live (TTL) field.

17. The method of claim 12 wherein the CDNI request routing response message includes a CDNI message header indicating a routing method code.

18. A content delivery network interconnection (CDNI) router comprising:
- an input configured to receive a first CDNI route advertisement message, the first CDNI route advertisement message including a set of routing entries, wherein each route entry includes an end-user Internet protocol (IP) address block, a path length in number of hops, parameters used to select a route, and policy parameters associated with the selected route;
- a processor configured to update at least one end-user-based CDNI routing table based on the end-user IP address blocks in the first CDNI route advertisement message; and
- an output configured to transmit a second CDNI route advertisement message, wherein the second CNDI route advertisement message includes an updated set of routing entries.

19. The CDNI router of claim 18 wherein the CDNI router is a content delivery network (CDN).

20. The CDNI router of claim 18 wherein the first CDNI route advertisement message and the second CDNI route advertisement message each include a respective sender CDN identification (ID).

21. The CDNI router of claim 18 wherein the first CDNI route advertisement message and the second CDNI route advertisement message each include a respective update flag set for subsequent updates after an initial CDNI route advertisement message.

* * * * *